(12) United States Patent
Singh et al.

(10) Patent No.: US 9,340,720 B2
(45) Date of Patent: May 17, 2016

(54) HEAT TRANSFER FLUIDS CONTAINING NANOPARTICLES

(75) Inventors: Dileep Singh, Naperville, IL (US); Jules Routbort, Hinsdale, IL (US); A.J. Routbort, legal representative, Willowbrook, IL (US); Wenhua Yu, Darien, IL (US); Elena Timofeeva, Chicago, IL (US); David S. Smith, Bartlett, IL (US); David M. France, Lombard, IL (US)

(73) Assignee: UChicago Argonne, LLC, Chicago, IL (US)

( * ) Notice: Subject to any disclaimer, the term of this patent is extended or adjusted under 35 U.S.C. 154(b) by 404 days.

(21) Appl. No.: 12/828,025

(22) Filed: Jun. 30, 2010

(65) Prior Publication Data

US 2011/0001081 A1  Jan. 6, 2011

Related U.S. Application Data

(60) Provisional application No. 61/222,804, filed on Jul. 2, 2009.

(51) Int. Cl.
  *C09K 5/00* (2006.01)
  *C09K 5/10* (2006.01)
  *C09K 5/08* (2006.01)
  *C09K 5/14* (2006.01)

(52) U.S. Cl.
  CPC ... *C09K 5/10* (2013.01); *C09K 5/08* (2013.01); *C09K 5/14* (2013.01)

(58) Field of Classification Search
  CPC .............. C09K 5/00; C09K 5/08; C09K 5/14; C09K 5/20
  USPC ............... 252/73, 70, 71, 78.1, 74, 75, 67; 361/697, 698, 699; 62/122; 165/164, 4
  See application file for complete search history.

(56) References Cited

U.S. PATENT DOCUMENTS 3,520,656 A * 7/1970 Yates et al. ............... 423/345
4,179,299 A * 12/1979 Coppola et al. ............ 501/90

(Continued)

OTHER PUBLICATIONS

Xie et al. International Journal of Thermophysics, vol. 23, No. 2, Mar. 2002, p. 571-580 "Thermal Conductivity of Suspensions Containing Nanosized SiC Particles".*
Singh et al. Journal of Applied Physics 105, 064306. published online Mar. 18, 2009 "An investigation of silicon carbide-water nanofluid for heat transfer applications".*

(Continued)

*Primary Examiner* — Jane L Stanley
(74) *Attorney, Agent, or Firm* — Foley & Lardner LLP

(57) ABSTRACT

A nanofluid of a base heat transfer fluid and a plurality of ceramic nanoparticles suspended throughout the base heat transfer fluid applicable to commercial and industrial heat transfer applications. The nanofluid is stable, non-reactive and exhibits enhanced heat transfer properties relative to the base heat transfer fluid, with only minimal increases in pumping power required relative to the base heat transfer fluid. In a particular embodiment, the plurality of ceramic nanoparticles comprise silicon carbide and the base heat transfer fluid comprises water and water and ethylene glycol mixtures.

18 Claims, 24 Drawing Sheets

(56) References Cited

U.S. PATENT DOCUMENTS

| | | | |
|---|---|---|---|
| 6,695,974 B2* | 2/2004 | Withers et al. | 252/70 |
| 8,192,924 B1* | 6/2012 | Barakat et al. | 435/2 |
| 8,834,739 B1* | 9/2014 | Cumberland et al. | 252/73 |
| 2007/0034354 A1* | 2/2007 | Tung et al. | 165/80.4 |
| 2008/0011978 A1* | 1/2008 | Kawaguchi et al. | 252/69 |
| 2008/0057833 A1* | 3/2008 | Bakshi et al. | 451/37 |
| 2009/0040716 A1* | 2/2009 | Fedorov | 361/694 |

OTHER PUBLICATIONS

Yu et al. International Journal of Heat and Mass Transfer, 52, 3606-3612. Published online Apr. 16, 2009 "Heat transfer to a silicon carbide-water nanofluid".*

Xie et al., "Thermal Conductivity of Suspension Containing SiC Particles", *Journal of Materials Science Letters*, (2002), pp. 193-195, Kluwer Academic Publishers.

* cited by examiner

HEAT TRANSFER FLUIDS CONTAINING NANOPARTICLES

CROSS REFERENCE TO RELATED PATENT APPLICATIONS

The present application claims priority to U.S. Provisional Patent Application No. 61/222,804, filed Jul. 2, 2009, and the contents of which are incorporated herein by reference in their entirety.

STATEMENT OF GOVERNMENT INTEREST

The United States Government claims certain rights in this invention pursuant to Contract No. W-31-109-ENG-38 between the United States Government and the University of Chicago and/or pursuant to DE-AC02-06CH11357 between the United States Government and UChicago Argonne, LLC representing Argonne National Laboratory.

FIELD OF THE INVENTION

This invention relates to heat transfer fluids. More specifically this invention relates to heat transfer fluids containing nanoparticles, frequently referred to as nanofluids.

BACKGROUND OF THE INVENTION

This section is intended to provide a background or context to the invention that is, inter alia, recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

A nanofluid generally refers to a liquid mixture with a small concentration of nanometer-sized (about 1 to 500 nm length scale) solid particles in suspension. Nanoparticles are typically made of chemically stable metals, metal oxides or carbon, in various forms. Some combinations of nanoparticles and liquids have been shown to substantially increase the heat transfer characteristics of the nanofluid over the base liquid.

Nanofluid heat transfer is a relatively new field being little more than a decade old. During that time, effort has been focused on determining the levels of potential thermal conductivity and heat transfer enhancements of a variety of nanofluids. In these investigations, the emphasis was usually on the magnitude of the thermal phenomena and not on the viability of the fluids for commercial applications. The thermal conductivity of nanofluids in particular has received considerable attention by researchers. Thermal conductivity is easier to measure than the heat transfer coefficient and has been used as an indicator of nanofluid heat transfer enhancement.

Enhancements in the thermal conductivities of nanofluids, for the most part, follow the predictions based on Maxwell's mean field theory assuming low concentrations and spherical nanoparticles or the effective medium theory (EMT). For small nanoparticle concentrations, EMT predicts thermal conductivity enhancement as $(\kappa_f/\kappa_{bf}) \approx 1+3\phi$, where $\kappa_f$ and $\kappa_{bf}$ are thermal conductivities of the nanofluid and the base fluid, respectively, and $\phi$ is the nanoparticle volume fraction. However, there are instances where the actual enhancements are significantly higher than EMT predictions at very low concentrations of nanoparticles. These anomalous enhancements have typically been reported for metallic nanoparticles in fluids. Modest thermal conductivity enhancements over EMT predictions can also be achieved by modifying the shape of the nanoparticles.

Thermal conduction in nanofluids has been attributed to a variety of mechanisms, including Brownian motion, interactions between the nanoparticles and the fluid, clustering and agglomeration. There is no clear consensus on a specific mechanism; however, the general belief is that a combination of mechanisms may be operating and would be specific to a nanoparticle/fluid system and test conditions. Further, the effect of interface layers on the nanoparticles on thermal conductivity is not clearly understood. A metal particle with surface oxidation, for example, may increase the interfacial resistance and consequently reduce the thermal conductivity.

Experimental results from various nanofluid research efforts have considered a number of parameters, including without limitation: (1) particle volume concentration, (2) particle material, (3) particle size, (4) particle shape, (5) base fluid, (6) temperature, (7) additive, and (8) pH. These studies have shown heat transfer enhancement results, based on Nusselt number, to be generally in the 15-40% range for particle volume concentrations up to 4%. Some research has found that the heat transfer enhancement was close to or somewhat above predictions from standard liquid heat transfer correlations using the nanofluid properties. Nusselt number enhancement of 40% is attractive to many applications, if the nanofluid is commercially viable.

However, studies of thermal phenomena in nanofluids have generally failed to make detailed characterizations of the fluids. For instance, it is known that particle agglomeration may occur in many nanofluids so that the nominal particle size in a powder is often not the size in the suspension. In fact, particle size distributions often exist in nanofluids but are seldom measured. As a result, literature data based on nominal particle size, may in fact have involved significantly different average particle sizes and distributions in suspension.

SUMMARY OF THE INVENTION

Industrial applications for nanofluid technology are in an embryonic stage. However, today, the nanofluid field has developed to the point where it is appropriate to look to the next level, i.e., nanofluids that show substantial heat transfer enhancement over their base fluids and are candidates for use in industrial/commercial systems. For example, potential use of nanofluids for cooling systems such as radiators in vehicles will require not only enhanced thermal properties, but also minimal negative mechanical effects of the nanofluid in a closed system. In this regard, viscosity of the nanofluid for instance is a contributing factor to pumping power needed for the circulation of the nanofluid.

Further, any erosive and clogging effects of the nanofluids on the fluid transmission lines or radiator can have an adverse effect on its use. Various nanofluids that may find widespread acceptance for industrial use should preferably be, as a minimum, stable suspensions with little or no particle settling, available in large quantities at affordable cost, environmentally neutral, and non-toxic. In addition, such applications would generally prefer that there be little change in particle agglomeration over time and that the nanofluid not be susceptible to adverse surface adhesion.

A favorable combination of desirable nanofluid characteristics can be achieved with, for example, ceramic nanoparticles disposed in a base fluid. Ceramic nanoparticles are not susceptible to surface oxidation, and enjoy significantly better chemical stability over longer periods of time than metals.

Although ceramics in general have low thermal conductivities, various ceramics possess thermal conductivities that make them attractive for use in nanofluids. Silicon carbide, for example, has one of the highest bulk thermal conductivities among ceramics. A silicon carbide/water nanofluid provides a significant increase in heat transfer over a water base fluid, while requiring only a minimal increase in pumping power. Further, the silicon carbide/water nanofluid is viable in both heating and cooling applications. These advantages can be extended to various ceramic nanoparticles and base fluid systems. For example, ethylene glycol and solutions of water and ethylene glycol are attractive base fluids for commercial and industrial nanofluid heat transfer systems. Notably, a ceramic water-ethylene glycol nanofluid provides improved heat transfer with only a modest increase viscosity over the base fluid.

Implications of ceramic nanofluids with enhanced thermal characteristics can be significant in terms of efficient cooling systems, higher productivity, and energy savings. Some potential applications for nanofluids could be for heat exchangers, radiators for engines, process cooling systems, microelectronics, and other demanding heat transfer applications.

In one embodiment, a nanofluid for use in a heat transfer application, comprises a base heat transfer fluid and a plurality of ceramic nanoparticles dispersed throughout the base heat transfer fluid with a particle size and a particle concentration such that a stable nanofluid is formed. The preferred ceramic nanoparticles comprise a composition characterized by a thermal conductivity where the nanofluid has a nanofluid thermal conductivity that is greater than the base heat transfer fluid thermal conductivity. The nanofluid is further characterized by a coefficient of heat transfer that is greater than the base fluid coefficient of heat transfer at a constant Reynolds number for the nanofluid and base fluid.

These and other advantages and features of the invention, together with the organization and manner of operation thereof, will become apparent from the following detailed description when taken in conjunction with the accompanying drawings, wherein like elements have like numerals throughout the several drawings described below.

DETAILED DESCRIPTION OF VARIOUS EMBODIMENTS

The present invention pertains to a heat transfer fluid that provides a favorable combination of the characteristics most desirable in a nanofluid. For example, an advantage of ceramic nanoparticles is that they are less susceptible to surface oxidation, unlike metals, and are thus, much easier to incorporate into a fluid. Further, the chemical stability of ceramic nanoparticles over long periods of time is significantly better than metals. While ceramics, as a class of materials, in general have low thermal conductivities, various selected ceramics enjoy a relatively high thermal conductivity making them attractive for use in nanofluids.

Silicon carbide (SiC), for example, has one of the highest bulk thermal conductivities among ceramics, about 120 W/m-K. A SiC/water nanofluid possesses many of the characteristics desirable in an industrially viable heat transfer nanofluid, including being well behaved; thermal conductivity enhancement is reasonably high, and the viscosity increase is relatively low. Concentrated slurries of SiC in water are available to dilute with water or water and ethylene glycol to desired concentrations. Further, settling and agglomeration do not occur under controlled pH. Still further, the SiC/water system presents a nanofluid that offers long-term stability and ready availability. All of these conditions contribute to the potential commercial viability of the particular nanofluid as a heat transfer fluid. In a particular embodiment, a SiC particle water nanofluid has been shown to achieve enhancement in thermal conductivity of at least about 28 percent over that of water alone. SiC dispersed in, for example, a mixture of ethylene glycol and water, has also shown improved thermal conductivity and desirable viscosity characteristics. SiC dispersed in other fluids and various other ceramic particles and combinations thereof may likewise achieve similar advantages of characteristics indicative of enhanced heat transfer and industrial applicability. Accordingly, these advantages can be extended to other ceramic nanofluid systems. For example, carbide materials generally offer several advantages, including the absence of oxidation; and various carbides, such as silicon carbide, have relatively high thermal conductivities.

Figure 1:
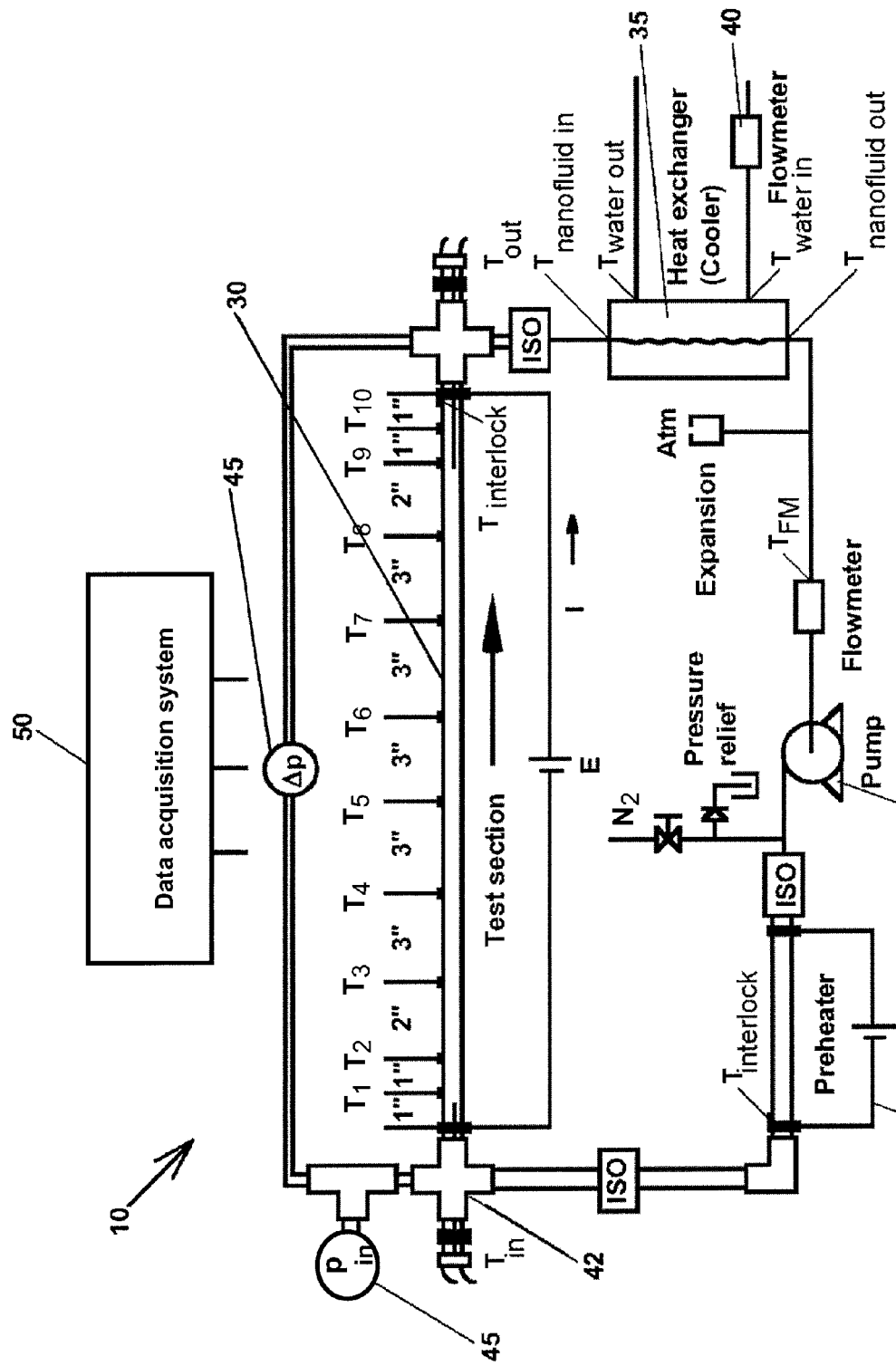
FIG. 1 shows a schematic depicting a closed-loop test facility applicable for evaluating heat transfer properties of various fluids and nanofluids.

In order to characterize the applicability of various ceramic nanofluids as commercially viable heat transfer fluids, a test facility was constructed. As shown in FIG. 1, the test facility is a closed-loop system 10 that comprises a pump 20 with variable speed drive, a preheater 25, horizontal tube test section 30, a heat exchanger (cooler) 35, and a flowmeter 40. The maximum system operating pressure and temperature were 273 kPa and 200° C., respectively, for the SiC/water nanofluid, and the system flow rate was in the range of 17 to 1000 ml/min, allowing Reynolds numbers to 30,000. The preheater 25 permits the inlet temperature to the test section 30 to be set at desired levels. The test section 30 comprises a type 316 stainless steel circular tube with dimensions of 2.27-mm inside diameter, 4.76-mm outside diameter, and a 0.58-m heated length. The preheater 25 and the test section 30 are individually resistance-heated with controllable direct current power supplies (not shown) and are electrically isolated from the remainder of the facility with short sections of high-pressure hose, designated ISO in FIG. 1.

As a safety precaution, both the preheater 25 and test section 30 are provided with high temperature limit interlocks to prevent them from being overheated. Thermocouples (T) are used to measure wall and fluid temperatures along the test section 30 heated length for calculating heat transfer coefficients. The pressure at the test section inlet 42 and pressure drop across the test section 30 are also measured by using electronic pressure transducers 45. The pressure transducers 45, the flowmeter 40, and the thermocouples (T) were calibrated against standards traceable to the National Institute of Standards and Technology (NIST). The estimated uncertainty in the measurements of pressures, flowrate, and temperatures are ±3%, ±1%, and ±0.2° C., respectively.

The typical test procedure involves fluid flow (at a specific flow rate) in the test section 30. In small increments, heat is applied to the test section 30 using a current controlled preheater 25. Using the flow control on the pump 20, the preheater 25, and the cooling water flow, the desired test conditions are achieved. Once steady state is reached, temperature data is acquired using the thermocouples (T) placed along the test section 30. Using the temperature data, flow rates and pressures, the heat transfer coefficient is determined. At steady-state conditions, all sensor outputs were read 30 times by the data acquisition system and then averaged together for future processing. These data included 10 test section outside wall temperatures ($T_1$-$T_{10}$), test section inlet and outlet fluid temperatures ($T_{in}$ and $T_{out}$), test section inlet fluid pressure ($p_{in}$), overall pressure drop across the test section ($\Delta p$), current through the test section (I), voltage drop across the test section (E), test fluid flow rate, temperature at the pump ($T_{FM}$), heat exchanger (cooler) inlet and outlet temperatures of the nanofluid and cooling water ($T_{nanofluid\ in}$, $T_{nanofluid\ out}$, $T_{water\ in}$, and $T_{water\ out}$), cooling water flow rate, and ambient temperature.

A data acquisition system 50 comprising a computer and a Hewlett-Packard multiplexer was assembled to record outputs from all sensors. A data acquisition software program, which includes all calibration equations and conversions to desired engineering units, was written and deployed in the computer. The data acquisition system 50 provides an on-screen display of signals from all sensors and graphs of representative in-stream and wall-temperature measurements for steady state monitoring. When desired test conditions are reached, the data acquisition system 50 records multiple readings of temperatures, power input, fluid flow rate, and pressures for subsequent data reduction.

Figure 2:
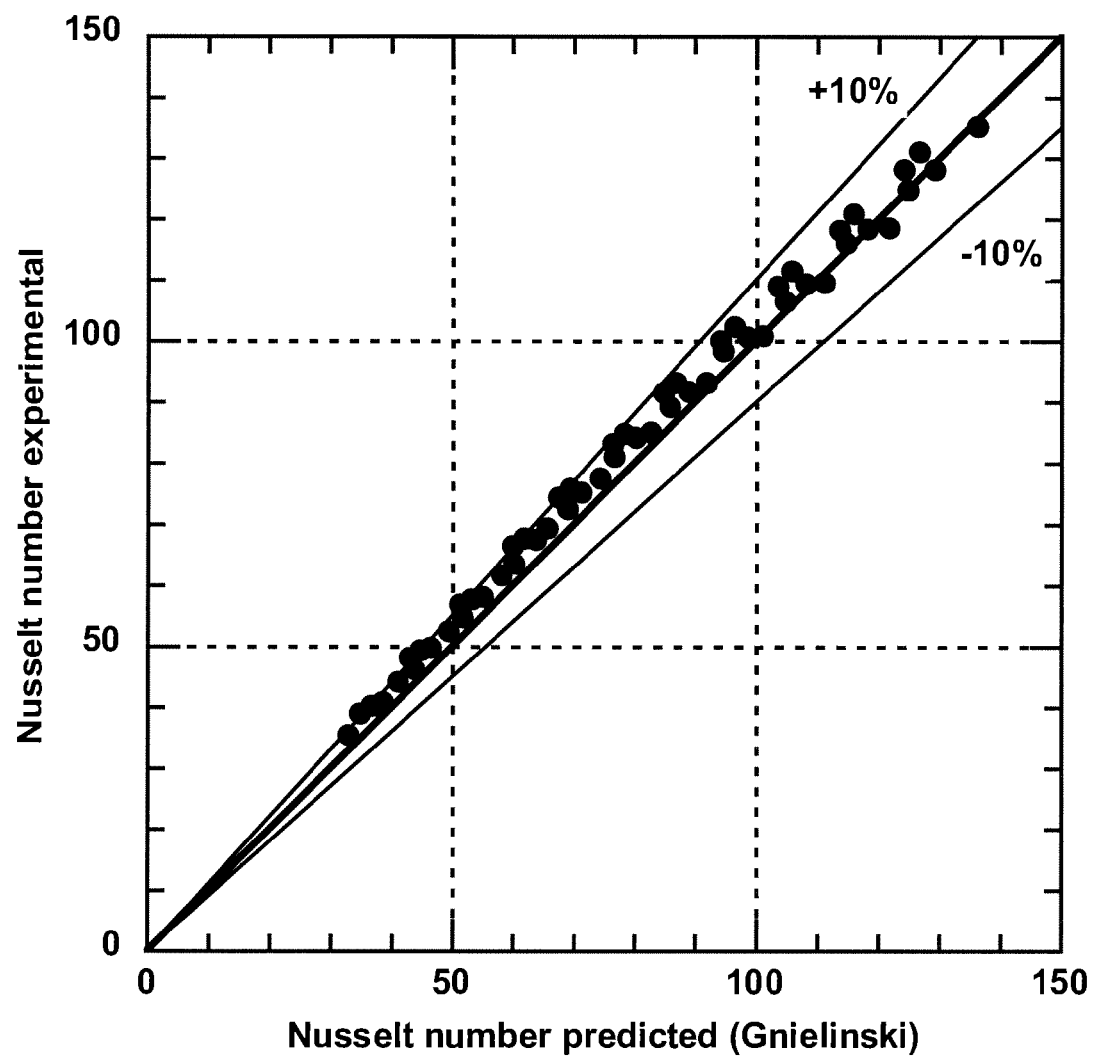
FIG. 2 shows a plot of experimental Nusselt numbers for water obtained using the test facility of FIG. 1 in relation to predicted values from the Gneilinski equation.

Heat transfer tests were performed using the closed loop test system 10 on the base fluid, for example, water for the SiC/water nanofluid, from the same source as used to produce the SiC/water nanofluid. These tests provided baseline heat transfer data for comparison to nanofluid data, and they served as control tests for the test facility. FIG. 2 shows that the experimental Nusselt numbers for water are in good agreement with the predicted values from the Gneilinski equation with most of the differences less than 10%. This agreement serves as an overall verification of the facility, sensors, data acquisition, and data reduction procedures. Although the test section was thermally well insulated from the atmosphere and the test section heat loss was small (less than 1%) during heat transfer tests, the heat loss was incorporated into the data reduction procedure for improved accuracy.

A series of experiments of forced convective heat transfer under turbulent flow conditions were conducted to evaluate the performance of various ceramic nanofluids. The local convective heat transfer coefficient at a position x along the length of the test section is defined by Equation 1.

$$h(x) = \frac{q''(x)}{T_{win}(x) - T_e(x)} \qquad \text{Eq. (1)}$$

In Equation 1, the local surface heat flux q"(x) was determined from the measured test section heater voltage and current (corrected for losses) and the local electrical resistivity of the tube as a function of temperature along the test section. The inner wall surface temperature of the test section $T_{win}(x)$ was determined from a radial heat conduction calculation by using the measured outer surface temperature $T_{wout}(x)$ and the local heat generated in the test section wall per unit length, q'(x). The local nanofluid temperature $T_e(x)$ was calculated, from a linear relation between test section inlet and outlet temperatures, at the same location where the wall temperature, $T_{wout}(x)$ was measured.

In one group of evaluations, tests on a 3.7 vol. % SiC/water nanofluid were carried out with the following experimental parameters: Reynolds number (Re) of 3300-13000, Prandtl number (Pr) of 4.6-7.1, and local nanofluid temperature for heat transfer coefficient determination $T_e$ of 34° C. to 57° C. In another set of tests, measurements were made on fluids with particle loadings ranging from 1-7 vol. %. However, various nanofluids having an increased particle loading may be readily prepared in accordance with the teachings described herein. In yet another set of tests, the test temperature was varied from about 25° C. to 70° C. for fluids with 1-4 vol. % nanoparticle loadings. Further, baseline thermal conductivities of fluid without nanoparticles were determined at each test condition to establish the effect of particle additions.

The pH values of the fluids were maintained between 9-10 to keep the nanoparticles uniformly dispersed. No surfactants were added to the fluids. Mean size of the SiC particles was 170 nm and both rounded as well as angular particles were observed. Viscosity of the 3.7 vol. % nanofluid was 1.65 cP at 25° C. and, on a normalized basis with water, did not change with the test temperature. Optical microscopy of diluted nanofluid showed minimal agglomeration of the nanoparticles. The as-fabricated nanofluid showed no particle settling. For physical and thermal characterizations, as-received fluids were diluted to various (1-4 vol. %) nanoparticle loadings using deionized water and $NH_4(OH)$ solution used to maintain a pH of 10.

Figure 3:
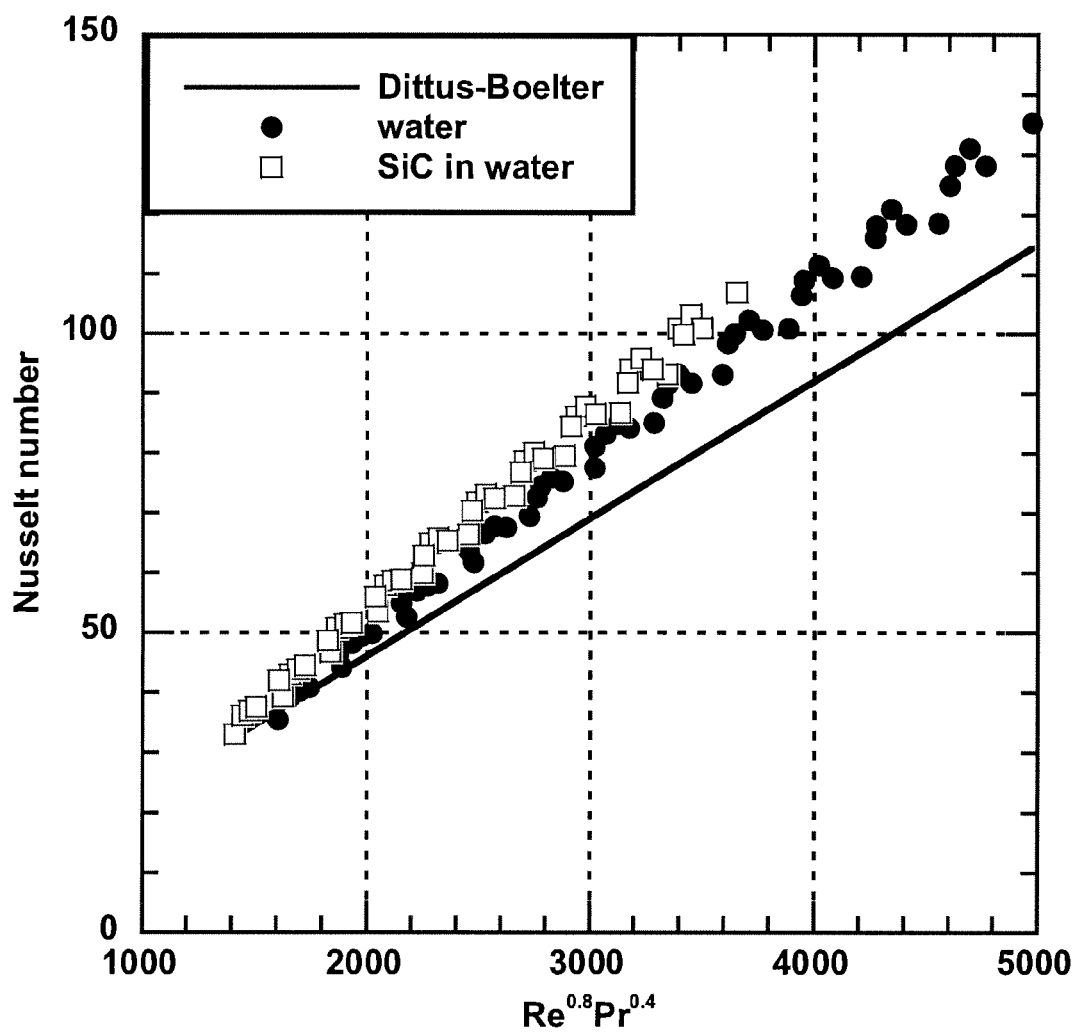
FIG. 3 shows a plot of experimental results for Nusselt number for a SiC/water nanofluid according to an embodiment of the present invention with respect to the parameter $Re^{0.8} Pr^{0.4}$ of the Dittus-Boelter correlation.

Results of the Nusselt number for the SiC/water nanofluid are shown in FIG. 3 and are compared to the water only data. The Nusselt numbers are plotted against the parameter $Re^{0.8} Pr^{0.4}$ taken from the Dittus-Boelter correlation. Use of this parameter incorporates temperature effects on fluid properties. The nanofluid data of FIG. 3 are seen to be above the water only data in all cases, indicating an enhancement in heat transfer over the base fluid (water) taken at equal values of the parameter $Re^{0.8} Pr^{0.4}$.

Figure 4:
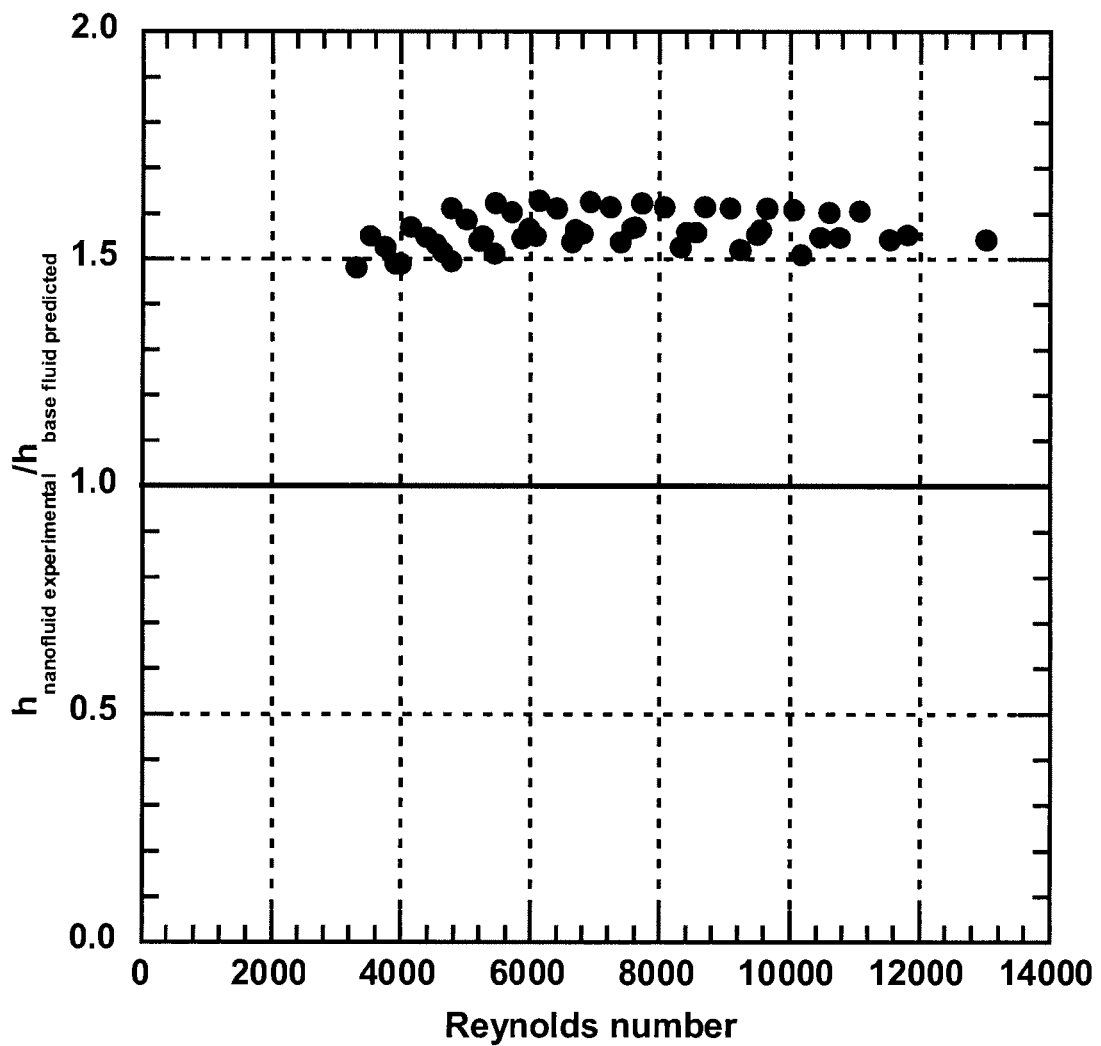
FIG. 4 shows a plot of the ratio of the experimental heat transfer coefficient for the SiC/water nanofluid of FIG. 3 to the predicted water heat transfer coefficient from the Gneilinski correlation.

The enhancement to the heat transfer of the SiC/water nanofluid over its base fluid water is shown in detail in FIG. 4. Here is plotted, the heat transfer enhancement, the ratio of the experimental nanofluid heat transfer coefficient to the predicted water heat transfer coefficient from the Gneilinski correlation. Compared on the basis of Reynolds number (the most common basis for comparison), the nanofluid heat transfer enhancement is substantial and in the range of a 50% to 60% increase over water.

In order to determine nanofluid heat transfer coefficients from experimental measurements or from correlations based on such experiments, nanofluid density and heat capacity are usually required. Here, the effective density and specific heat were calculated based on the physical principle of the mixture rule (Equation 2) as:

$$\rho_e = (1-v_p)\rho_m + v_p\rho_p \quad \text{Eq. (2)}$$

$$C_{pe} = \frac{(1-v_p)(\rho C_p)_m + v_p(\rho C_p)_p}{\rho_e} = \frac{(1-v_p)(\rho C_p)_m + v_p(\rho C_p)_p}{(1-v_p)\rho_m + v_p\rho_p} \quad \text{Eq. (3)}$$

Equation 3 is typically used for nanofluid specific heat, and the effective specific heat determined through energy balances during the experiments in this study was found to be within 1% of the calculation.

Figure 5:
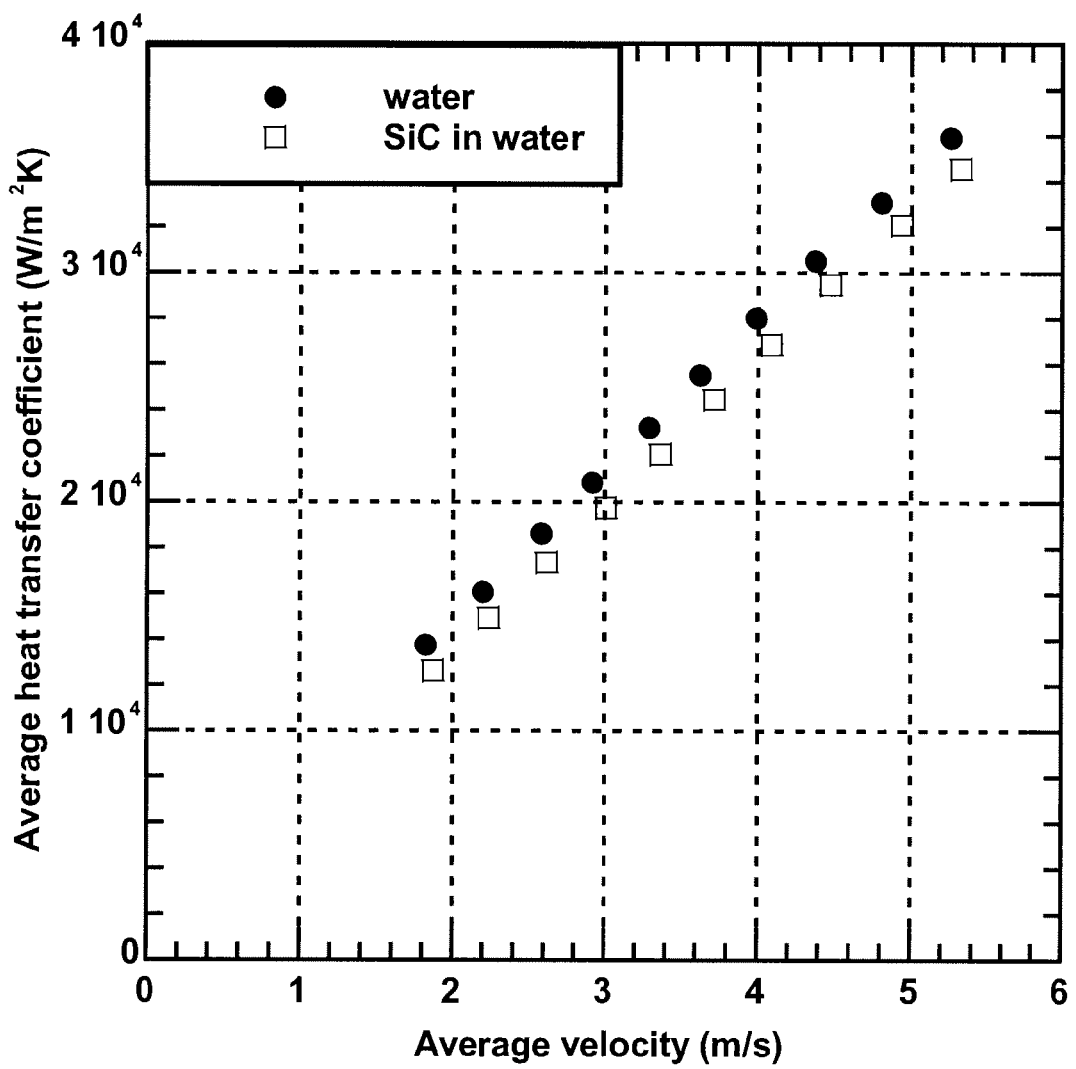
FIG. 5 shows a plot of average heat transfer coefficient for a SiC/water nanofluid in relation to the base fluid at constant velocity.

In general, comparing nanofluid heat transfer to its base fluid at constant Reynolds number is not the best basis of comparison. For example, if the pressure drop and pumping power of the nanofluid are larger than those of the base fluid, a higher velocity for the nanofluid would be required to achieve the same Reynolds number. Alternatively, a constant velocity comparison may be used in various instances. FIG. 5 presents a constant velocity comparison for the SiC/water nanofluid. The results show that, at a constant velocity, the SiC/water nanofluid has a heat transfer coefficient that is 7% below the base fluid. This trend is similar to results for aluminum oxide, titanium oxide, and zirconium oxide/water nanofluids. However, the decrease of the SiC/water nanofluid heat transfer coefficient is less than the drop observed for the aluminum oxide nanofluid. By using a constant velocity comparison, this reduced heat transfer coefficient of the nanofluids compared to that of the base fluid water occurs even though the thermal conductivities of the nanofluids are higher than that of the base fluid in all cases. The reasons for this result depend on several factors, including the combination of thermal conductivity enhancement and viscosity increase found in the nanofluid. Increased thermal conductivity reduces resistance to thermal diffusion in the laminar sublayer of the boundary layer. However, increased viscosity enlarges the thickness of the sublayer and in turn increases its resistance to heat transfer. The net effect depends on the magnitudes of these competing phenomena, and the results for the SiC/water nanofluid are the best of this group.

The potential of the SiC/water nanofluid is also seen in the Mouromtseff value Mo that includes all of the fluid properties related by the Dittus-Boelter equation, Equation 4.

$$Mo = \frac{k^{0.6}\rho^{0.8}C_p^{0.4}}{\mu^{0.4}} \quad \text{Eq. (4)}$$

Here, k, ρ, Cp, and μ are the thermal conductivity, density, specific heat, and viscosity, respectively. A fluid with the higher Mo provides a larger heat transfer coefficient at the same velocity for a particular system. The Mo ratio of SiC/water nanofluids to water ranges from 0.95 to 0.83 for particle concentrations from 1.85% to 7.4%. Thus, considering the Mo ratio in isolation, the SiC/water nanofluid in the tested ranges may not perform as well as water alone for certain heat transfer applications in the turbulent regime. However, Mo does not incorporate any additional heat transfer mechanisms that have been observed in nanofluid heat transfer studies that indicate enhanced heat transfer of ceramic nanofluids.

If both the base fluid and nanofluid heat transfer coefficients are reasonably predictable by a standard single-phase heat transfer correlation like the Dittus-Boelter equation, then the Mouromtseff number can be used to indicate the heat transfer coefficient of the nanofluid compared to its base fluid under conditions of constant velocity by using Equation 4. For example, the ratio of the Mouromtseff number for an $Al_2O_3$/water nanofluid to that of the base fluid water has been found to be 0.75. However, the ratio of the SiC/water to water ratio was found to be substantially higher, average of 0.89. Higher values of the Mouromtseff ratio are indicative of better heat transfer.

Figure 6:
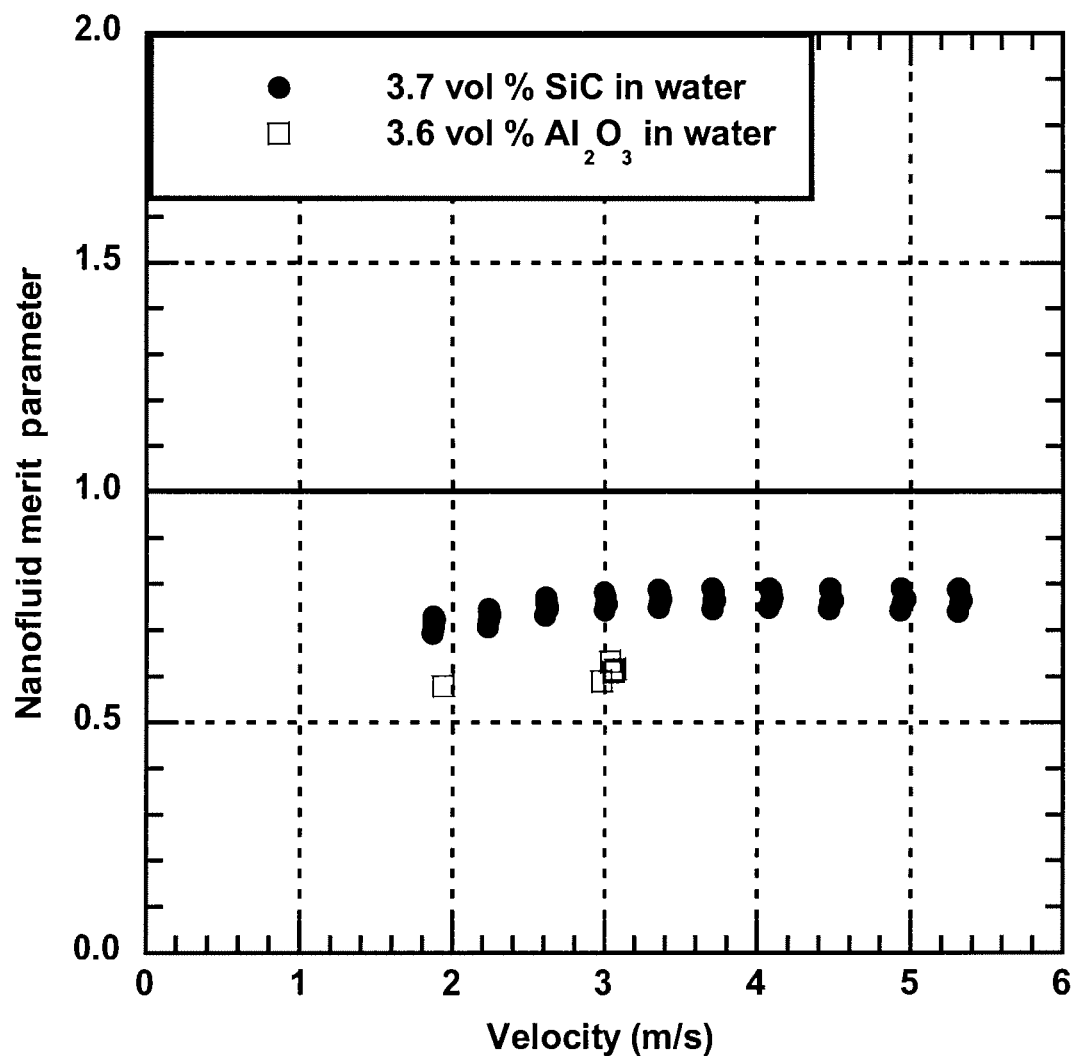
FIG. 6 shows a plot of the merit parameter for a SiC/water nanofluid (3.7% vol.) and a $Al_2O_3$/water nanofluid (3.6% vol.) for various velocities.

The concept of pumping power penalty is often used as a measure of comparison in augmented heat transfer situations. Various applications are more sensitive to this factor than others. The pumping power may be combined with the heat transfer enhancement to produce a parameter indicative of the overall merit of a nanofluid. This nanofluid merit parameter is the ratio of the heat transfer enhancement to the pumping power increase, i.e., ($h_{nanofluid}/h_{base\ fluid}$):($Power_{nanofluid}/Power_{base\ fluid}$). This parameter was calculated on the basis of constant flow velocities for the SiC/water nanofluids and its base fluid water flowing in smooth tubes. Results are shown in FIG. 6 for the SiC/water nanofluid and compared to an $Al_2O_3$/water nanofluid at a similar particle concentration. The merit parameter is of the order of about 0.8 for the SiC/water nanofluid while it is about 0.6 for the $Al_2O_3$/water nanofluid. A higher merit parameter value indicates a greater gain in the heat transfer enhancement compared to the pumping power penalty. A desirable characteristic for a potentially viable nanofluid would be a high heat transfer enhancement that justifies a small pumping power increase over the base fluid.

Figure 7:
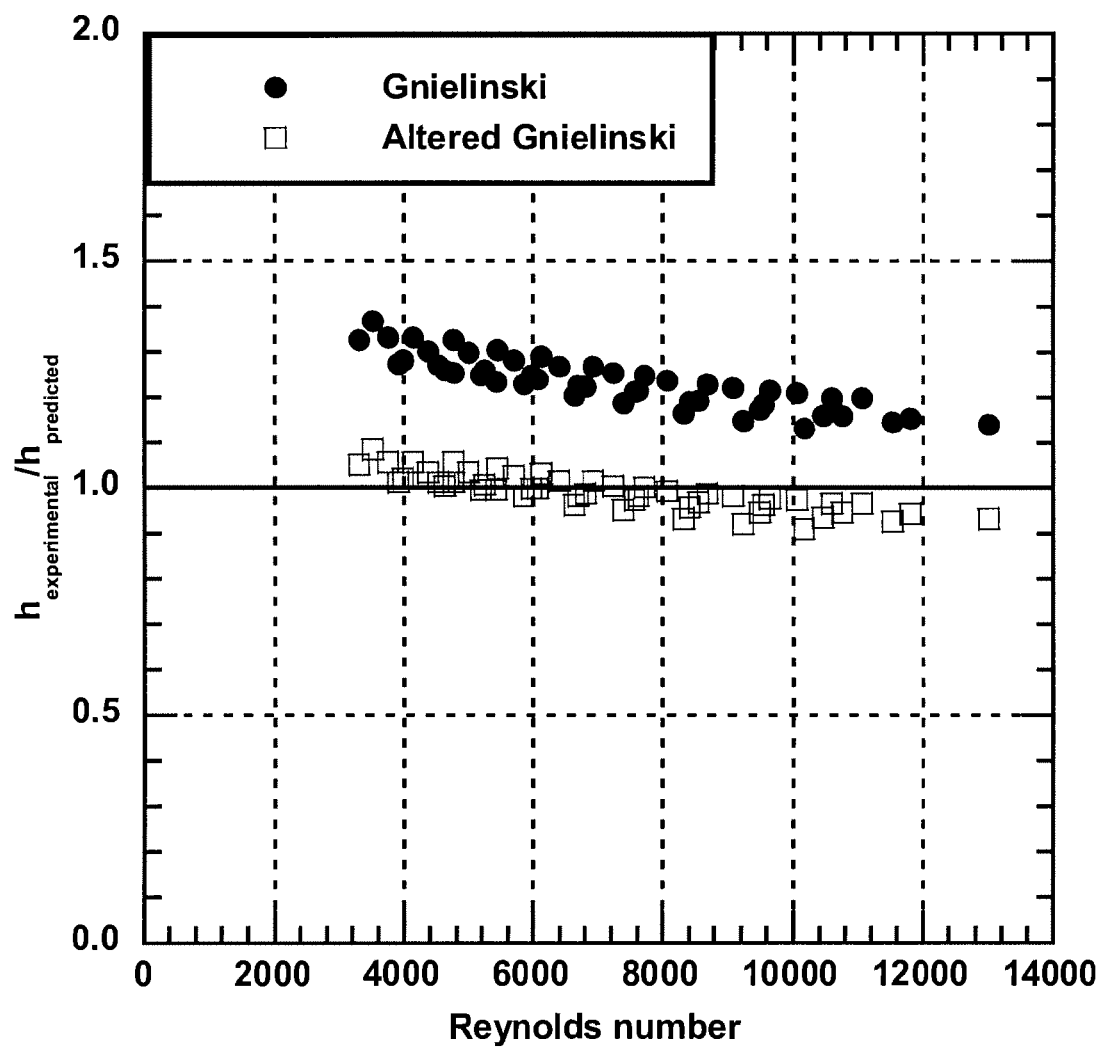
FIG. 7 shows a plot of the heat transfer for a SiC/water nanofluid according to the Gneilinski equation and the altered Gneilinski equation with respect to Reynolds number.

In FIG. 7, the nanofluid heat transfer data of FIG. 3 were compared to the predictions of the Gneilinski equation for the nanofluid. Here the predictions are from a standard single-phase turbulent heat transfer correlation based on the fluid being a pure liquid with the thermal and transport properties of the nanofluid. As seen in FIG. 7, the nanofluid heat transfer coefficient exceeded predictions in all cases, ranging from 14% to 32% above the predictions. This enhancement over the predicted value points to a heat transfer mechanism beyond that of a pure liquid because of particle interactions and contributions. Various Prandtl number dependencies have been suggested for nanofluids compared to pure liquids, including a modified form of the Dittus-Boelter equation with a Prandtl number exponent of 0.5 and an altered form of the Gneilinski equation. Results of the altered Gneilinski equation are also depicted in FIG. 7 and predict the performance of the SiC/water nanofluid quite well.

Only two slip mechanisms, Brownian diffusion and thermophoresis, were considered large enough to be responsible for measured nanofluid heat transfer enhancement over pure liquids. These mechanisms cause the concentration of nanoparticles near the heat transfer surface to be different when the fluid is being heated or cooled. Thus, it has been postulated that nanofluid heat transfer rates over base fluids would increase when being heated and decrease when being cooled. In all the cases discussed above, heat transfer rates were measured when the nanofluids were being heated, and nanofluid heat transfer coefficients were above their base fluids. To investigate the cooling condition, a series of evaluations was performed using the cooling heat exchanger in the experimental facility. Here, the average value of the heat transfer coefficient was obtained from a logarithmic mean temperature difference calculation using the flow rates and the inlet and outlet temperatures of both the nanofluid and coolant.

Figure 8:
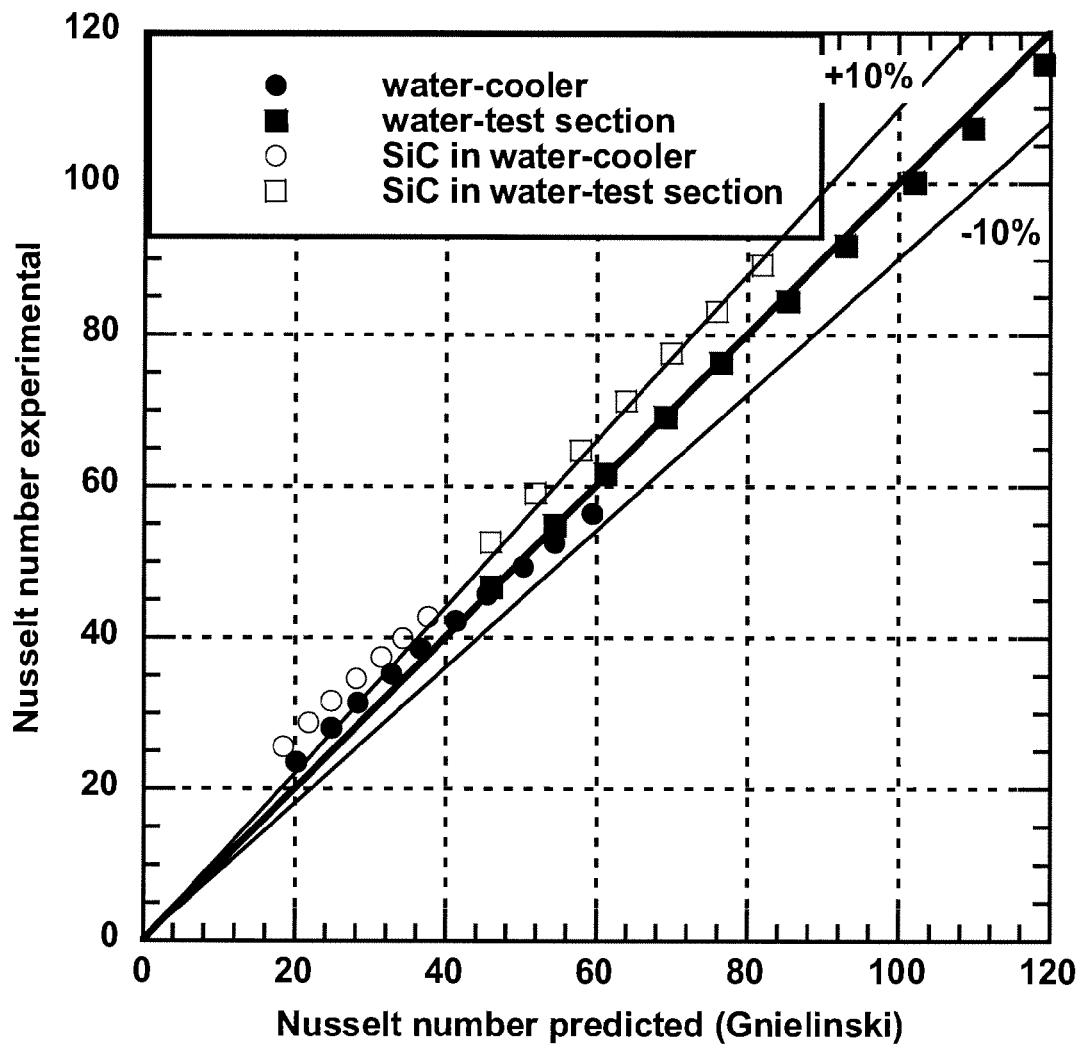
FIG. 8 shows a plot of Nusselt number determined using the test facility of FIG. 1 for a SiC/water nanofluid compared to the theoretical value.

Heat transfer results are shown in FIG. 8 for Nusselt numbers determined from measurements taken in the test section (fluid being heated) and in the cooler (fluid being cooled). The water data are well predicted by the Gneilinski equation independent of the source, i.e., test section or cooler, which validates the experimental approach used. The SiC/water nanofluid data were previously shown to be above the prediction when being heated. These test section results are reproduced in FIG. 8. The SiC/water data from the cooler would be expected to fall below predictions in FIG. 8. However, the opposite unexpectedly occurs. Experimental Nusselt numbers are seen in FIG. 8 to lie along the same curve that is above predictions of the Gneilinski equation whether in heating or in cooling mode. These results do not support the mechanisms of Brownian diffusion and thermophoresis as being responsible for the enhanced SiC/water nanofluid heat transfer rates over the base fluid water.

Whether or not nanofluid heat transfer data are predicted by liquid correlations gives insight into the heat transfer mechanisms involved. Although the results shown in FIG. 8 do not support the mechanisms postulated, the prediction of nanofluid heat transfer using increased Prandtl number dependence is clear from FIG. 7. However, predictability by liquid heat transfer correlations is not a key factor in assessing the potential of heat transfer enhancement associated with nanofluids. One nanofluid may show higher heat transfer enhancement than another even though both are predictable by liquid correlations. It is a positive result in terms of heat transfer enhancement when nanofluid heat transfer exceeds the predictions of liquid correlations. Such is the case with the SiC/water nanofluid.

Figure 9A:
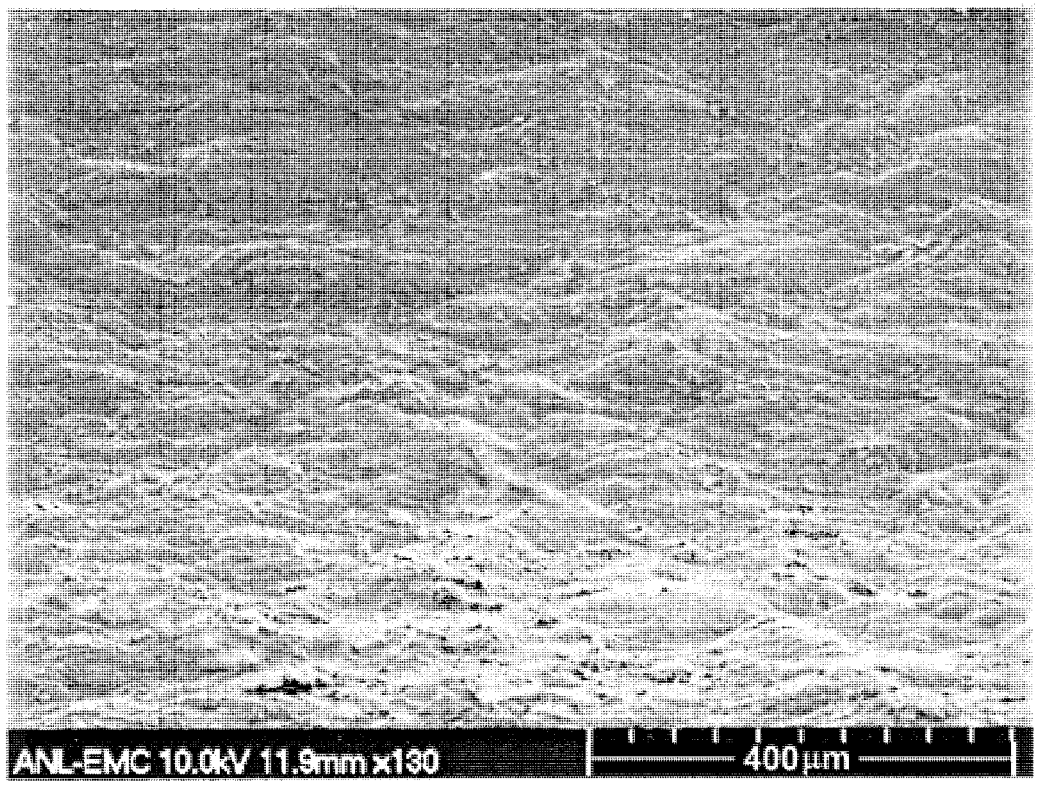
FIG. 9A is an scanning electron microscope (SEM) image of a portion of the test section of the test facility of FIG. 1 prior to testing.
Figure 9B:
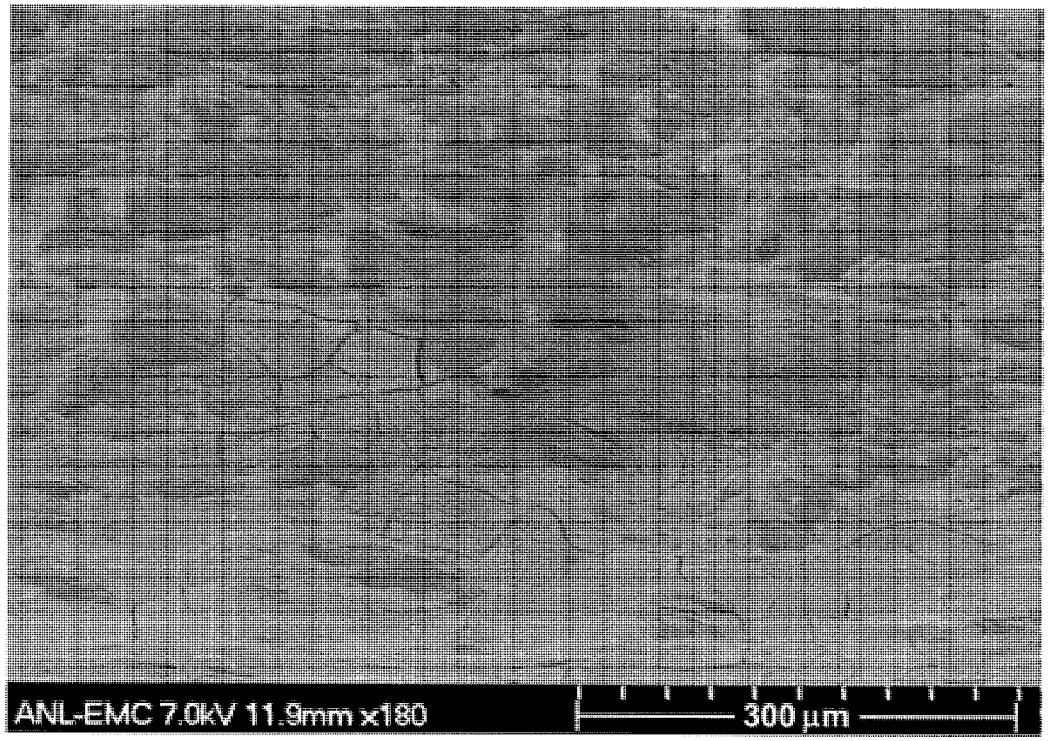
FIG. 9B is an image of a portion of the test section of the test Facility of FIG. 1 after testing with various SiC/water nanofluids.

Heat transfer enhancement in various nanofluids has been attributed to different mechanisms. For example, particle coating of the heat transfer surfaces has been identified as influencing heat transfer. The SiC/water nanofluid was found to coat the surface of the test section 30. The stainless steel test section 30 is shown in FIGS. 9A and 9B before and after testing, respectively with the SiC/water nanofluid. It is evident that the nanoparticles, deposited in the low areas of the surface, formed a coating of the order of about 100 particles thick. However, the coating did not contribute to the heat transfer results as evidenced by water data that were unchanged before and after the SiC coating was formed within the test section 30. Also, no change in heat transfer rate over time was detected from the initial introduction of the SiC/water nanofluid into the facility.

Figure 10:
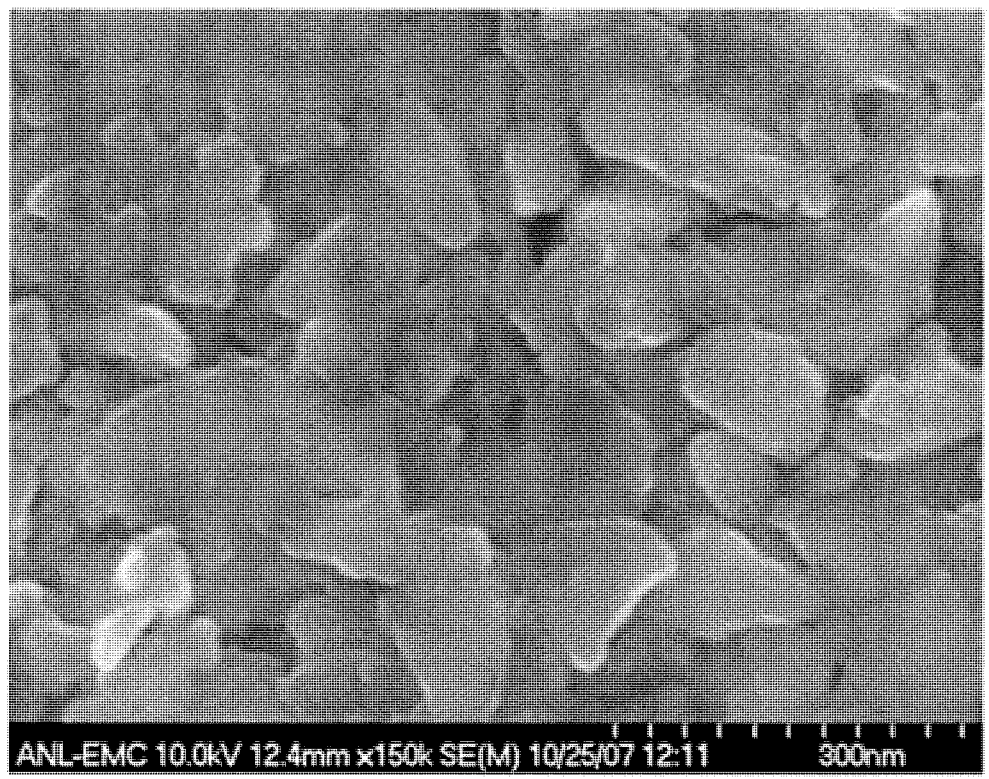
FIG. 10 is an SEM image indicating the particle size distribution of the SiC nanoparticles of a diluted volume of SiC/water nanofluid.
Figure 11:
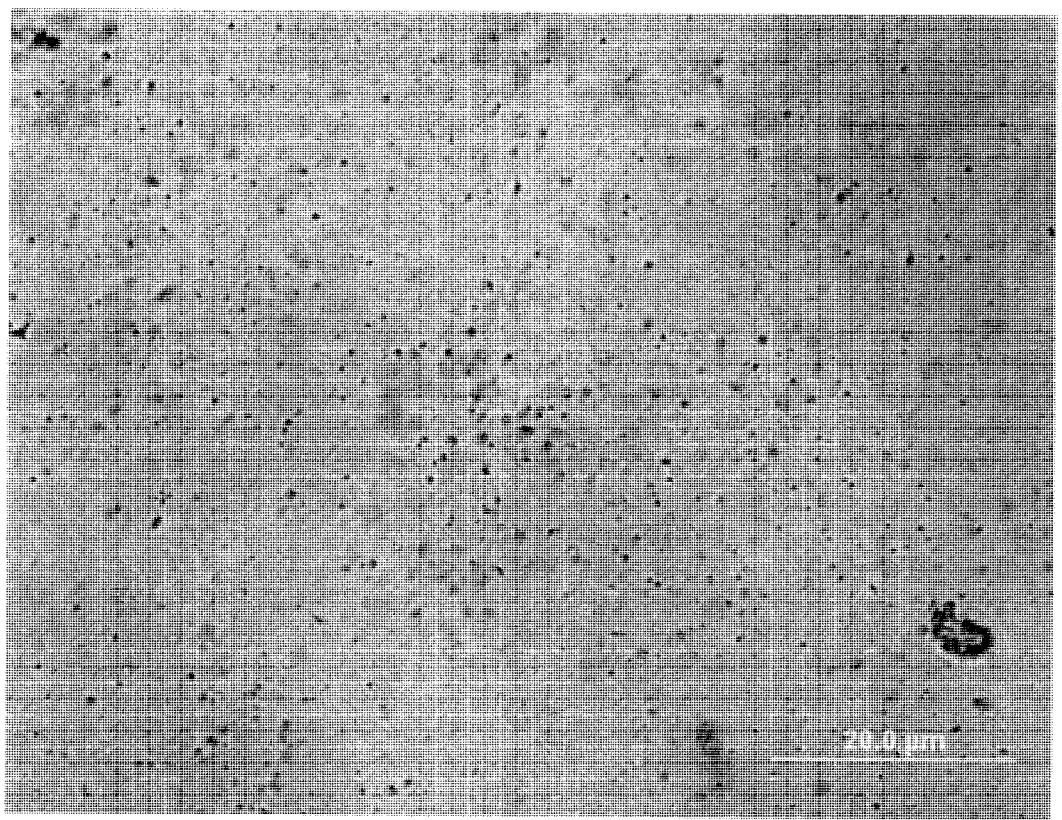
FIG. 11 shows an optical microscope image showing a distribution of SiC nanoparticles in a volume SiC/water nanofluid.
Figure 12:
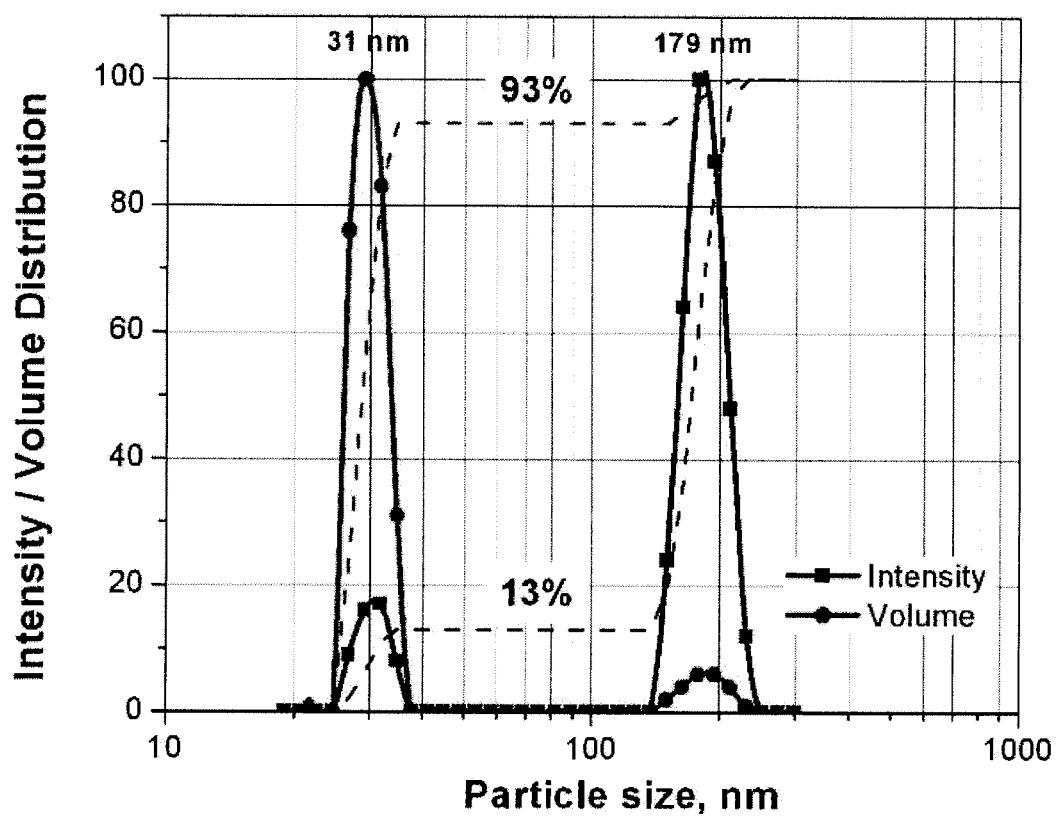
FIG. 12 shows a plot of particle size distribution for the SiC nanoparticles of a sample of SiC/Water nanofluid obtained using dynamic light scattering.

For physical and thermal characterizations, as-received fluids were diluted to various (1-4 vol. %) nanoparticle loadings using deionized water adjusted to a pH of 10 with sodium hydroxide. As seen in FIG. 10, the particles size varies over a relatively wide range from about 60 to about 250 nm in the longest direction. Both rounded as well as angular platelet-like particles are observed. FIG. 11 shows the distribution of SiC nanoparticles in the diluted fluid obtained using an optical microscope. The image shows no visible agglomeration of the nanoparticles, the size of the dark spots on the image not exceeding 0.2±0.05 μm. Results of particle size measurements using Dynamic Laser Scattering (DLS) technique, conducted using a table-top instrument (Brookhaven Instruments Corp., Holtsville, N.Y.), are shown in FIG. 12. High polydispersity (about 30%) of nanoparticles, observed from the SEM and optical images, is also reflected in the DLS spectra. Intensity and number distribution spectra show two peaks at 31 and 179 nm. Average particle size determined by lognormal distribution was about 130 nm.

Figure 13:
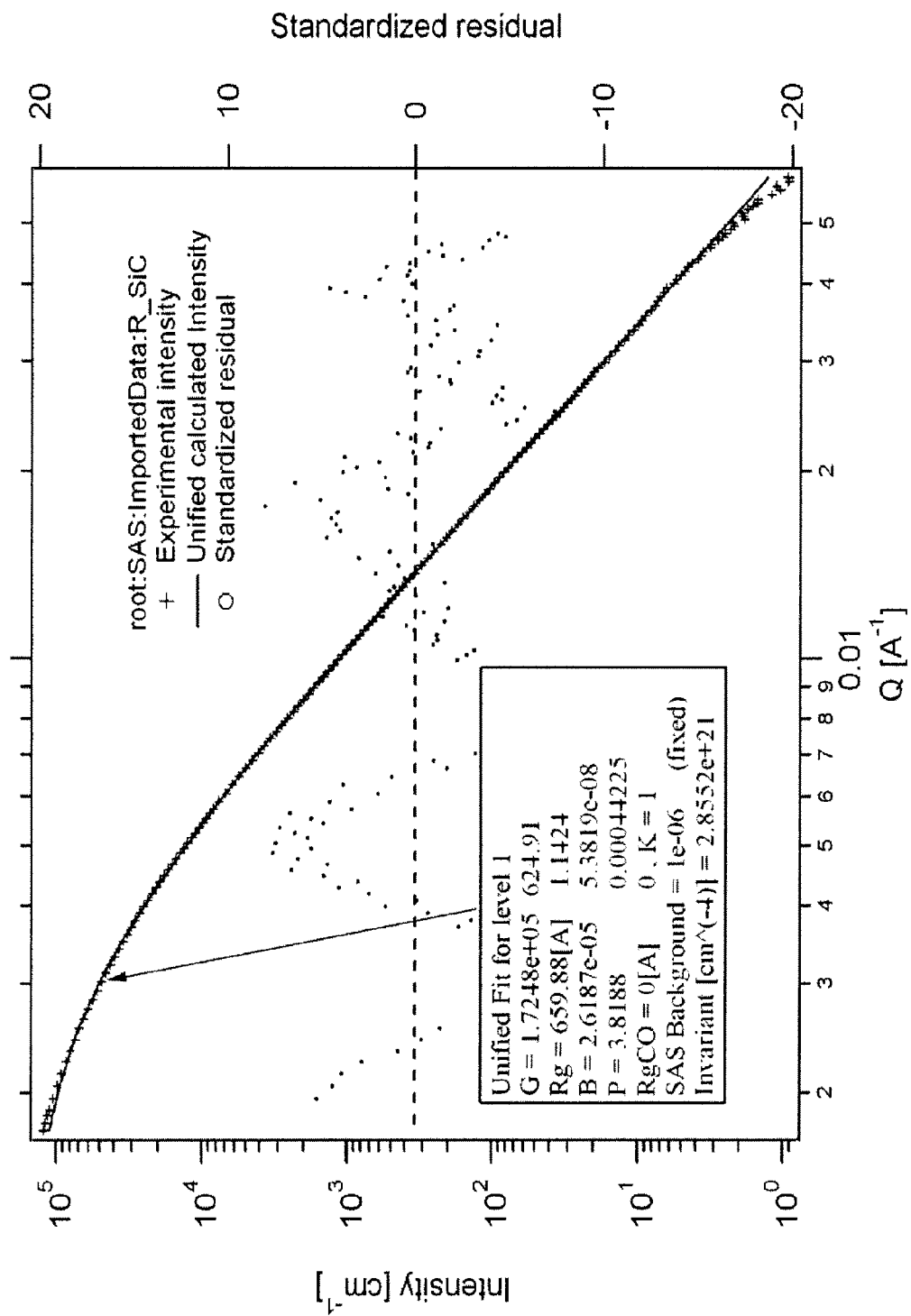
FIG. 13 shows a plot of the 1-D small angle x-ray scattering (SAXS) pattern of a diluted volume of SiC/water nanofluid showing X-ray scattering intensity versus scattering momentum change.

FIG. 13 shows the 1-D small angle x-ray scattering (SAXS) (obtained on beamline 15-ID-D at the Advanced Photon Source, Argonne National Laboratory) pattern of diluted SiC/water nanofluid. The plot of X-ray scattering intensity versus scattering momentum change ($q=4\pi \sin \theta/\lambda$), where θ is the scattering angle, and λ is the wavelength) on a log-log scale provides additional information about the nanoparticles. Because of relatively large, about 30% polydispersity in the SiC particle size, there were no oscillations in the scattering intensity observed that normally arise from the inherent form-factor scattering from the particles that have a narrow distribution in size. Experimental scattering data was fitted using the standard maximum entropy model (assumes particles are spherical in shape) that resulted an average particle size of 170 nm.

Figure 14:
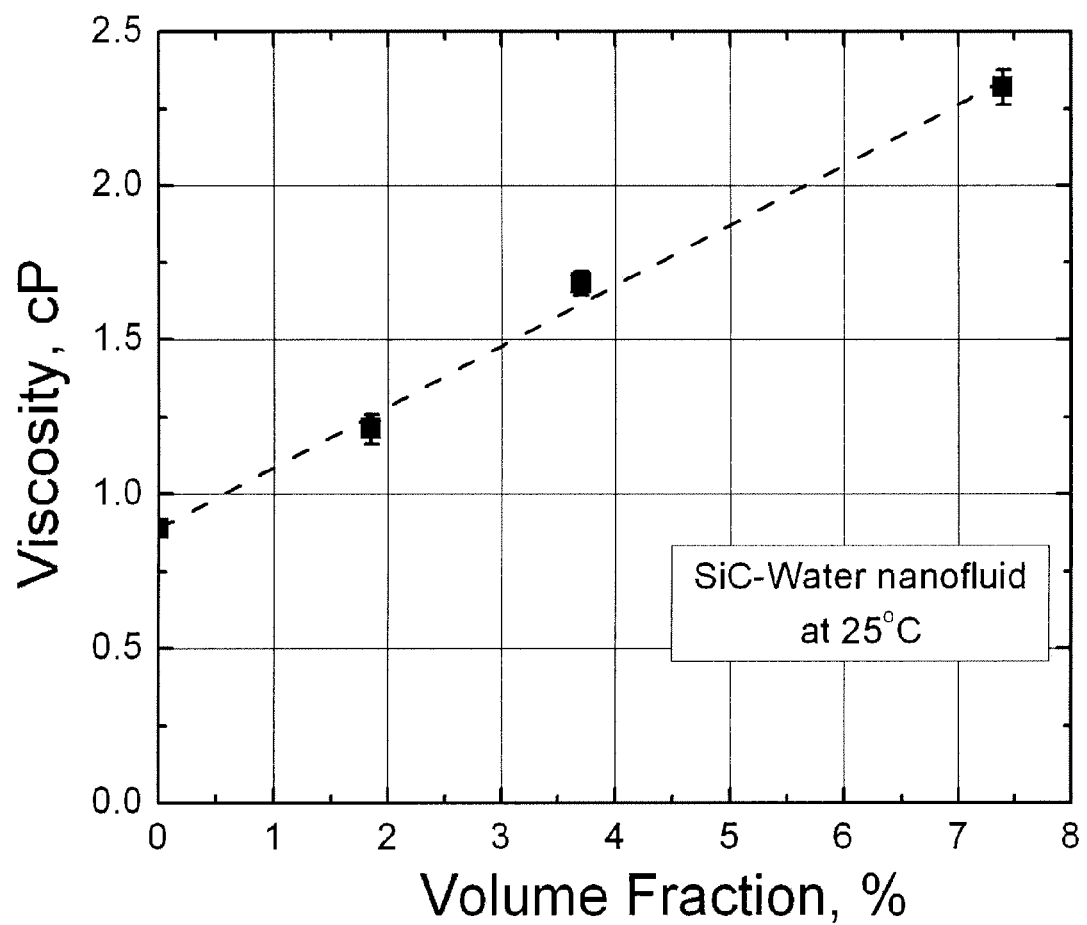
FIG. 14 shows a plot of viscosity of SiC/water nanofluids at 25° C. as a function of nanoparticle loading.
Figure 15:
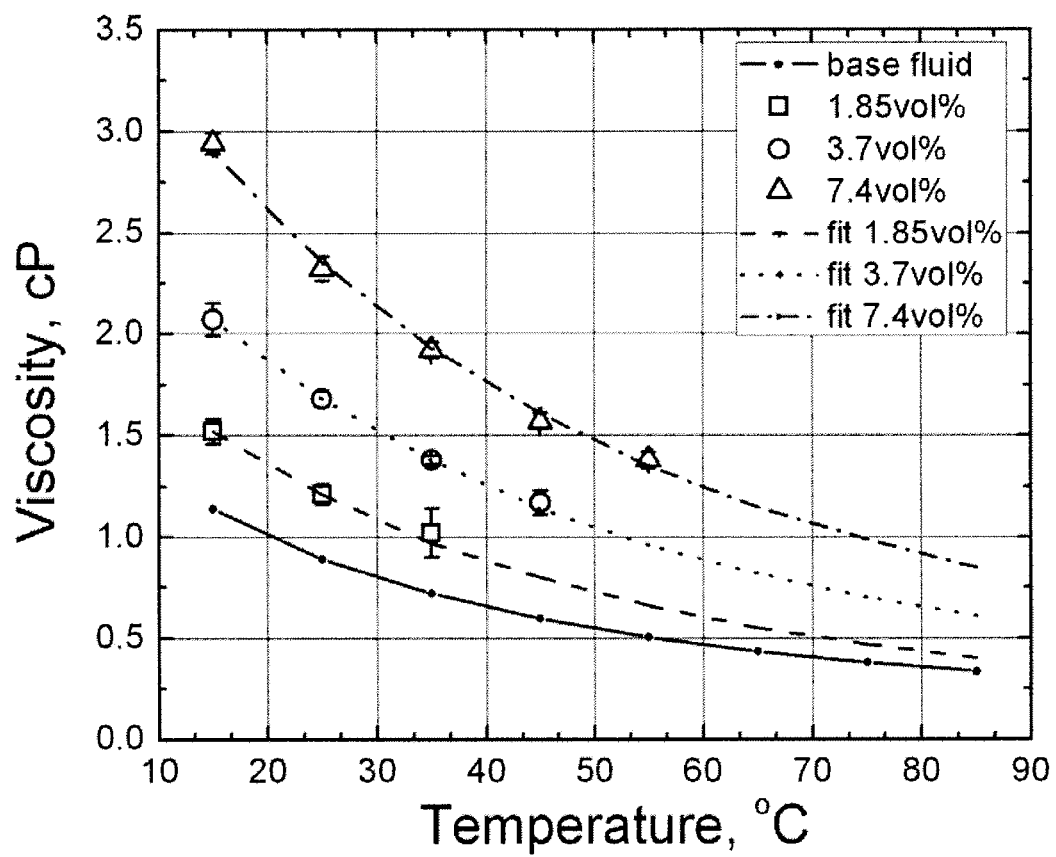
FIG. 15 shows a plot of viscosity of SiC/water nanofluids and water as a function of temperature for various nanoparticle loadings.
Figure 16A:
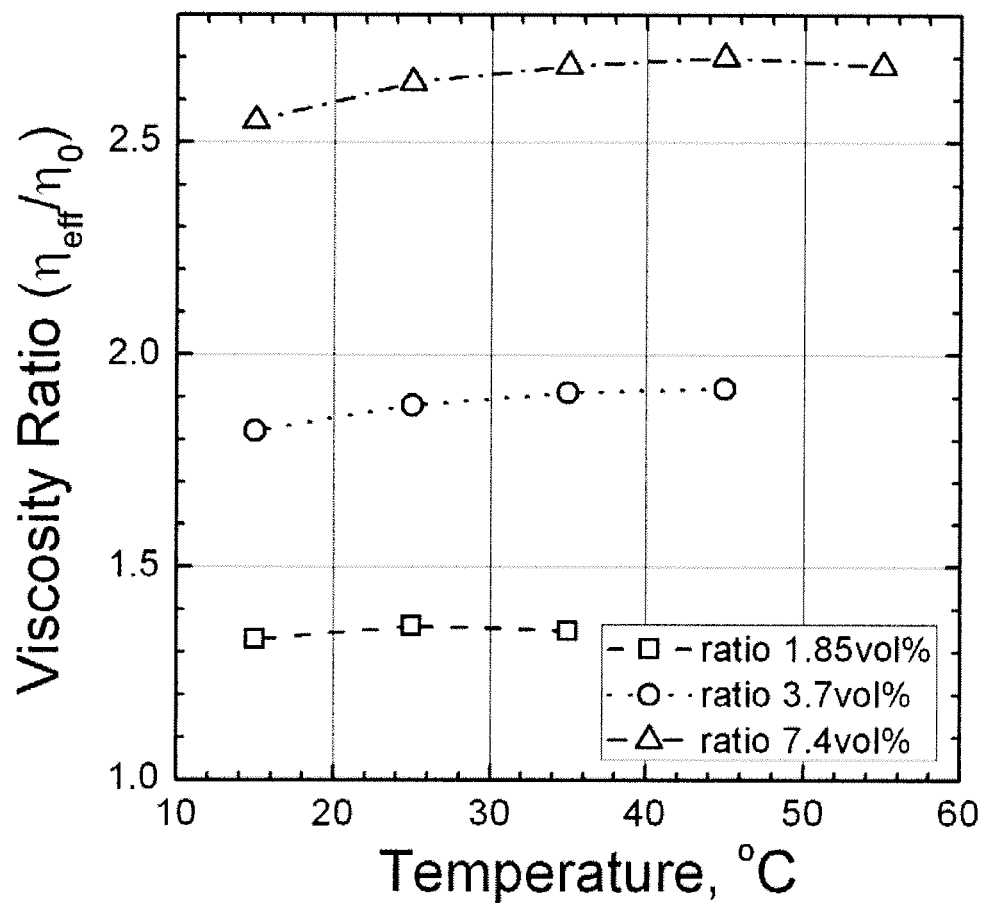
FIG. 16A shows a plot of viscosity of SiC/water nanofluids with various particle loadings normalized against the base fluid (water) as a function of temperature.
Figure 16B:
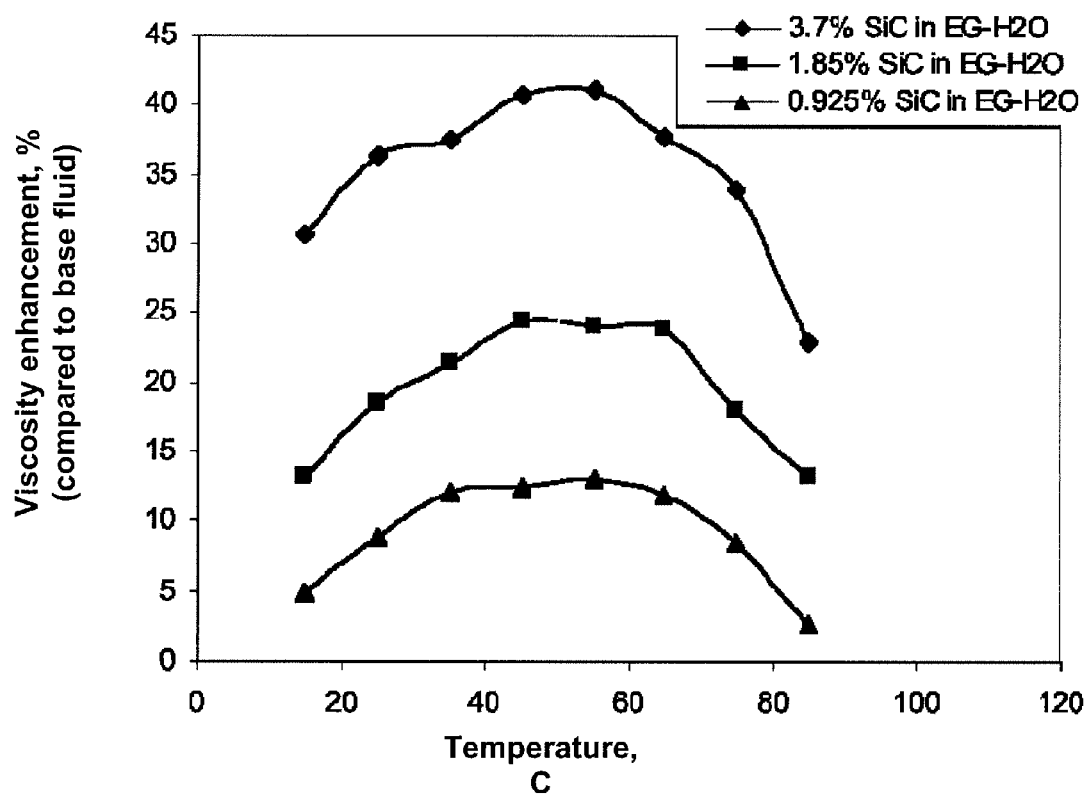
FIG. 16B shows a plot of viscosity of SiC/water-ethylene glycol nanofluids with various particle loadings normalized against the base fluid (water-ethylene glycol) as a function of temperature.

Viscosities of the nanofluids (1.8, 3.7 and 7.4 vol. % particle loadings) were measured as a function of temperature ranging from 15° C. to 55° C. and compared to viscosity of the deionized water. FIG. 14 shows the room temperature viscosity increase of the nanofluid with nanoparticle loadings. Viscosity variations for the nanofluids as a function of temperature are shown in FIG. 15. The viscosity of water decreases with increasing temperature from ambient value of 1.1 cP at 15° C. to 0.5 cP at 55° C. With the addition of nanoparticles, fluid viscosity increases with nanoparticle loadings. The highest viscosity (2.94 cP) was observed at 15° C. for the nanofluid with 7.4 vol. % loading. With increasing test temperatures, viscosities of the nanofluids also decreased, similar to the viscosity decrease of water. Experimental data on nanofluids' viscosity depicted in FIG. 15 were fitted with the Arrhenius equation (Equation 5) to estimate the nanofluids' viscosities at higher temperatures:

$$\eta = \eta_{\infty,T} e^{(E_a/RT)} \quad \text{Eq. (5)}$$

where, $\eta$ and $\eta_{\infty,T}$ are the measured viscosity and viscosity at infinite temperature, respectively, $E_a$ is the activation energy to viscous flow (J/mol), R is the gas constant and T is the absolute temperature in Kelvin. FIG. 16A presents the viscosities of the SiC/water nanofluids with three particle loadings normalized with that of base water as a function of test temperature. Interestingly, the normalized viscosities of SiC/water nanofluids are nearly constant over the range of experimentally studied temperature. FIG. 16B shows viscosity enhancement of the SiC/water-ethylene glycol nanofluids (equal volumes of water and ethylene glycol) with three particle loadings normalized with that of base fluid of water-ethylene glycol as a function of test temperature.

Measured viscosity for SiC/water nanofluids are relatively low and linearly increase with the concentration of nanoparticles (FIG. 14). Further, there was no shear rate dependence of the viscosity indicative of Newtonian fluid behavior. Applying the Arrhenius relation to the experimental data yielded activation energy for the SiC/water system to be 14-16 kJ/mol, which is somewhat lower than pure water (16.45 kJ/mol). In the particle loading regime investigated, there was no significant dependence of activation energy on particle loading. Physical interpretation of activation energy of viscous flow is not well developed for nanoparticle suspension, but described as the mean potential energy of interaction of two molecules for pure liquids or as the steepness of the temperature dependence of ceramic suspension viscosity. Thus, it appears that addition of SiC nanoparticles to water slightly decreases activation energy of viscous flow, and at increasing temperatures viscosity of nanofluids will decrease faster than viscosity of the base fluid. A lower fluid viscosity implies lower pumping power that is advantageous from an industrial application standpoint.

Figure 17:
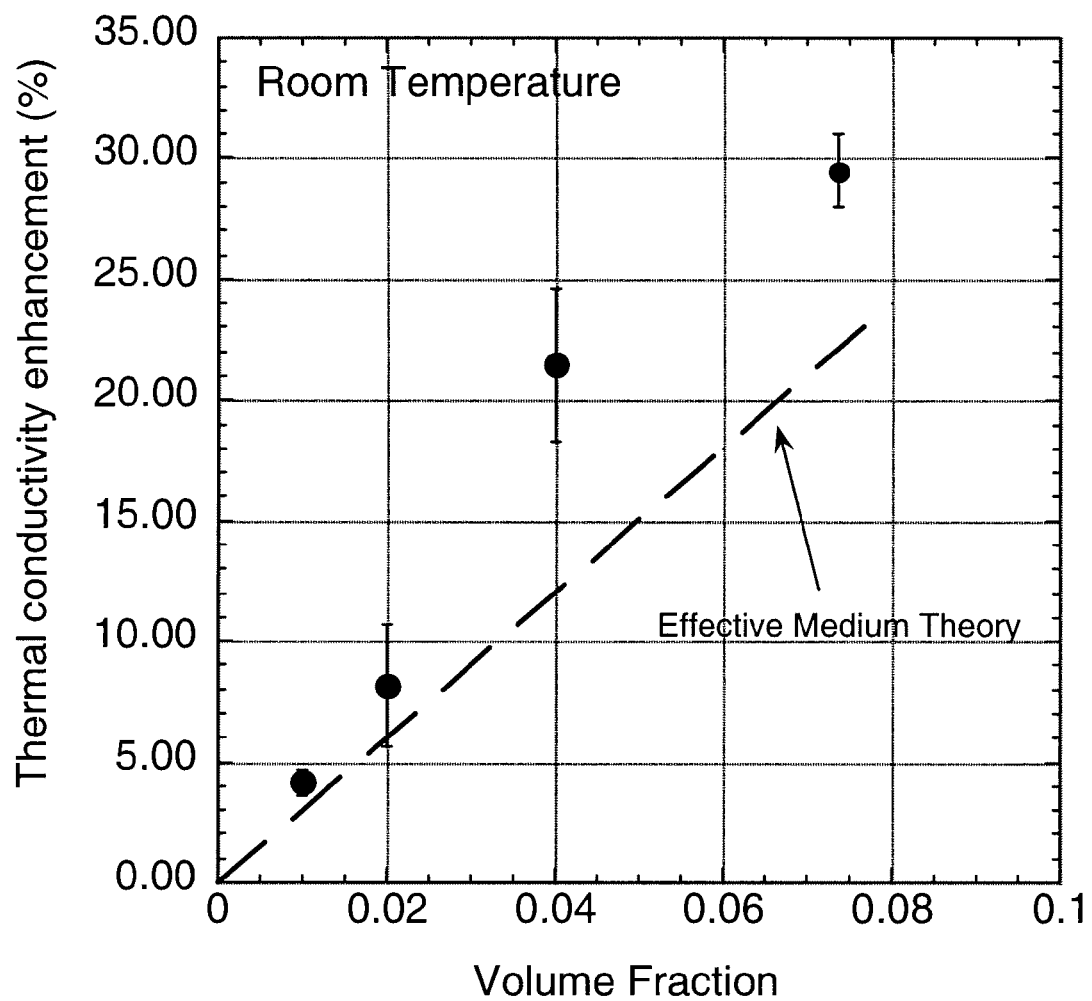
FIG. 17 shows a plot of thermal conductivity enhancement of SiC/water nanofluids over water as a function of nanoparticle volume fraction.
Figure 20:
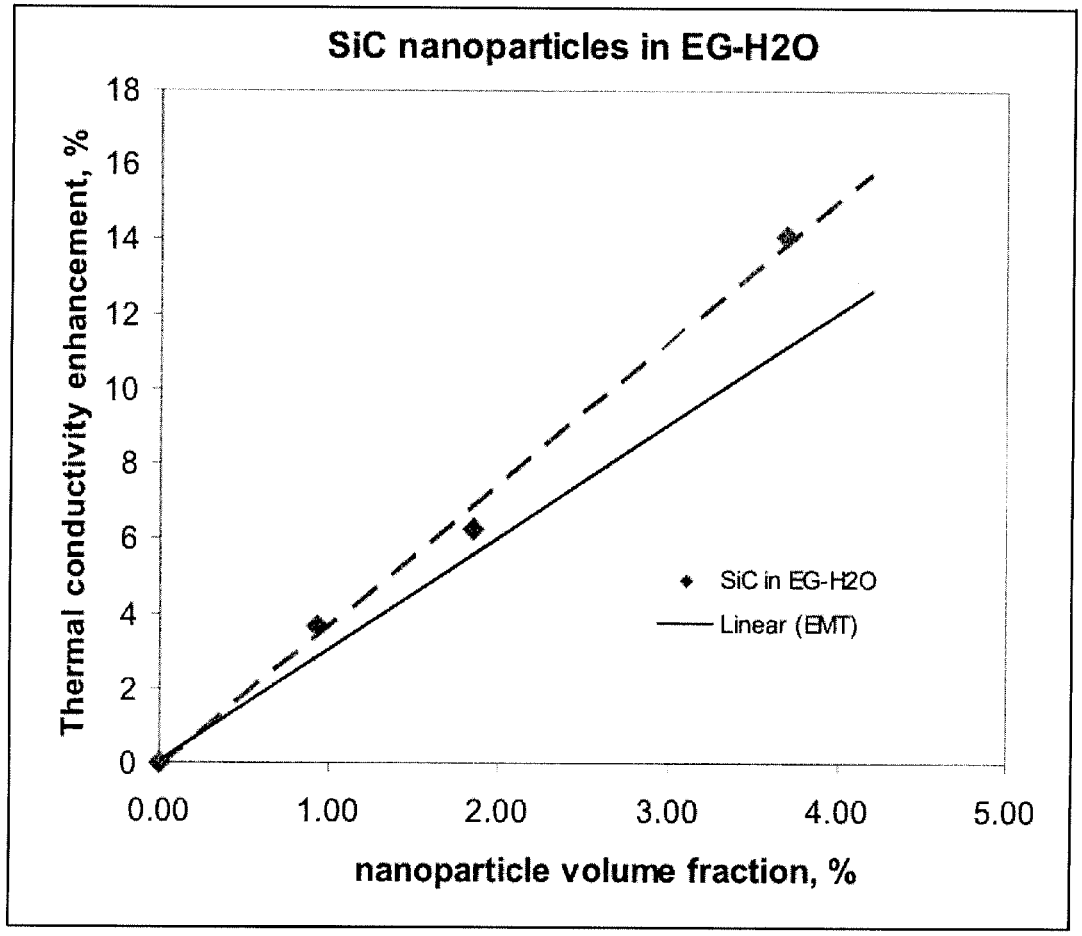
FIG. 20 shows a plot of thermal conductivity enhancement of SiC/water-ethylene glycol nanofluids over water-ethylene glycol (1:1) as a function of nanoparticle volume fraction.

FIG. 17 shows the enhancement in thermal conductivity of the SiC/water nanofluid over water as a function of nanoparticle volume fraction. Thermal conductivity of the base water fluid (pH=10) was measured as 0.609 (W/m-K) at ambient room temperature. Enhancement as high as 28% was observed for a particle loading of about 7.4 vol. %. Also shown in FIG. 17 is the prediction based on Maxwell's equation. At lower volume fractions, enhancements are quite similar to the prediction, however, at higher particle loadings (>4 vol. %), enhancements are unexpectedly higher than the predicted value. FIG. 20 shows the enhancement in thermal conductivity of SiC/water-ethylene glycol (1:1) nanofluid over water water-ethylene glycol (1:1) as a function of nanoparticle volume fraction. Using the water-ethylene glycol base fluid, enhancement of approximately 14% over the base fluid was observed for a particle loading of about 3.7 vol. %. FIG. 20 also shows the predicted thermal conductivity based on EMT. The water-ethylene glycol base fluid also provides greater than expected enhancement for particle loadings above about 1 vol. %.

Figure 18:
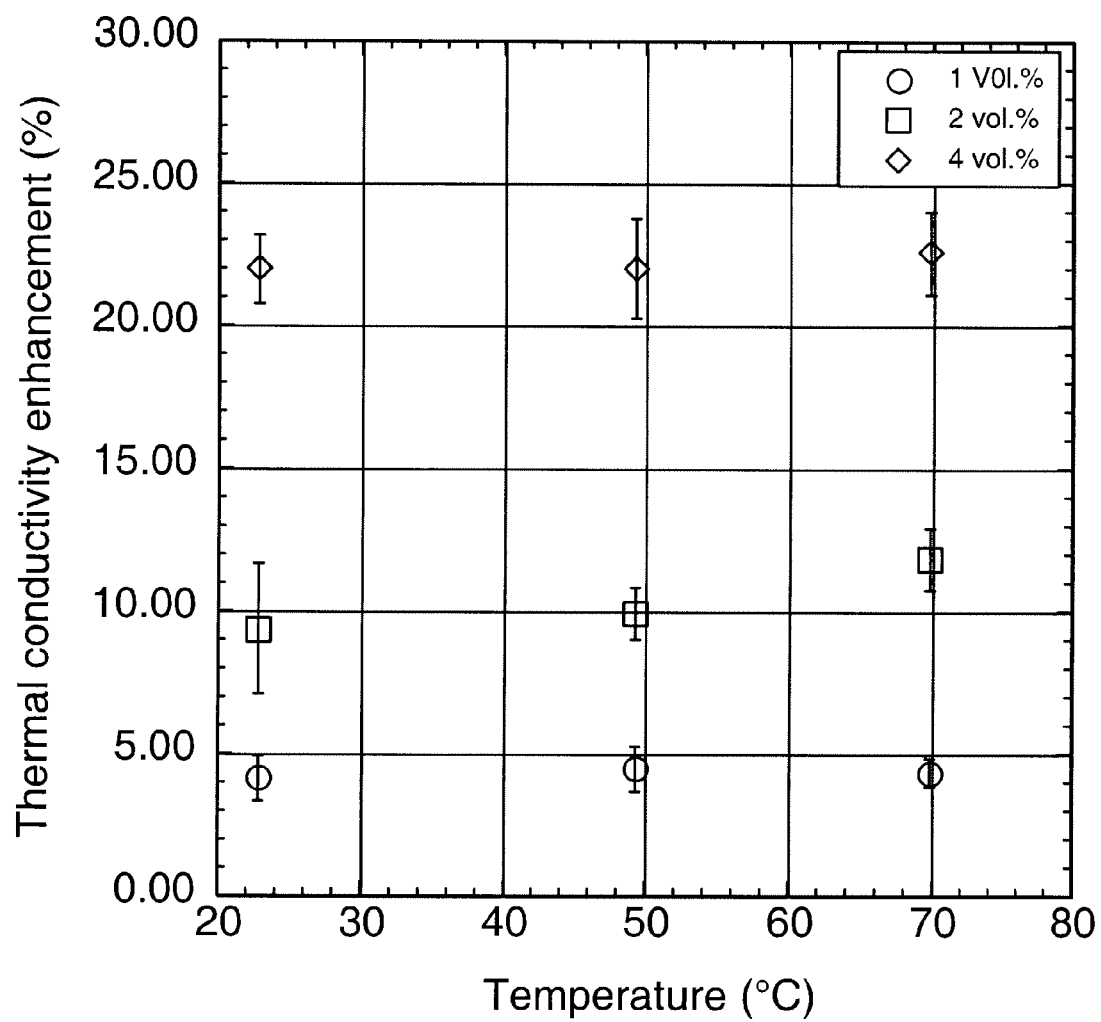
FIG. 18 shows a plot of thermal conductivity enhancement of SiC/water nanofluids of various particle loadings over water as a function of temperature.

Thermal conductivity of nanofluids was measured at 23, 50 and 70° C. FIG. 18 shows the normalized enhancements in the thermal conductivity for the nanofluids as a function of temperature. The variation of the thermal conductivity of the base water fluid was measured and was used for normalization. For all the nanoparticle loadings investigated, enhancement in the thermal conductivity over that of water, at the specific test temperature, was maintained constant at all studied temperatures.

The silicon carbide-water and silicon carbide-water/ethylene glycol nanofluid system exhibited an increase in the thermal conductivity as a function of particle loading at ambient room temperature. Surprisingly, the enhancements over the Maxwell's theory predictions for spherical particles are larger at higher particle loadings. Not to be limited by theory, this positive deviation can be rationalized based on the shape and/or aggregation effects of SiC nanoparticles at higher loadings. A Hamilton-Crosser model allows calculation of the thermal conductivity of a two-component heterogeneous mixture as a function of the conductivity of pure materials, composition of the mixture, and the manner in which the pure materials are distributed throughout the mixture (discontinuous phase, particles of various shapes) dispersed within continuous phase (base fluid) in either regular or irregular array). The effective ($k_{eff}$) conductivity enhancement is given by Eq. 6.

$$\frac{k_{eff}}{k_0} = \frac{k_p + (n-1)k_0 + (n-1)(k_p - k_0)\phi}{k_p + (n-1)k_0 - (k_p - k_0)\phi} \quad \text{Eq. (6)}$$

Here, $k_p$ and $k_0$ are the conductivities of the particle material and the base fluid, respectively, $\phi$ is the particle volume fraction, n is the empirical shape factor given by $n=3/\psi$ and $\psi$ is sphericity defined as a ratio of surface area of the particle and equivalent surface area of the sphere for a constant volume. For spherical shaped particles, the sphericity is 1, and it corresponds to a shape factor of 3 for which the Hamilton-Crosser equation (Equation 6) reduces to Maxwell's equation for the conductivity of randomly distributed and non-interacting homogeneous spheres in a continuous medium. Further, n=6 corresponds to cylindrical shaped particles with a 1:17 aspect ratio.

Figure 19:
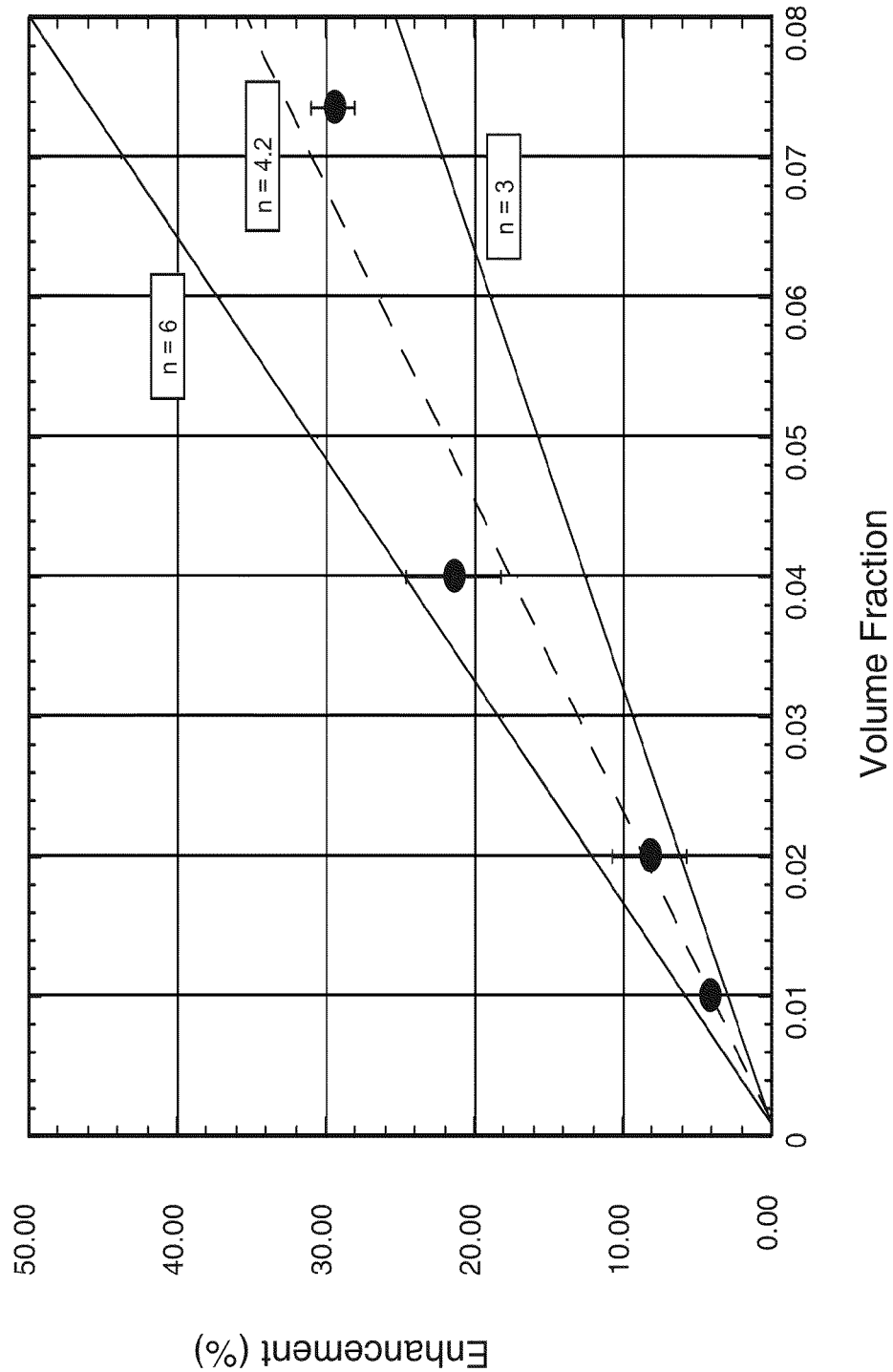
FIG. 19 shows a plot of thermal conductivity enhancement of SiC/water nanofluids over water as a function of nanoparticle volume fraction and predicted enhancement based on the Hamilton-Crosser model for n=3 and n=6.

FIG. 19 shows the thermal conductivity enhancements for the SiC/water system bounded by the predictions (solid lines) of Hamilton-Crosser model for n=3 and n=6. The dashed line is the prediction based on the shape factor of 4.2 and agrees well with the experimental data. Although several particle shapes are possible for the same value of shape factor; however, as seen in SEM image (FIG. 10), shapes of SiC nanoparticles are better described as disks or platelets. The ratio of diameter to height of the disks-like particles can be estimated from the shape factor for the SiC/water nanofluid and is found to be about 4:1.

Figure 21:
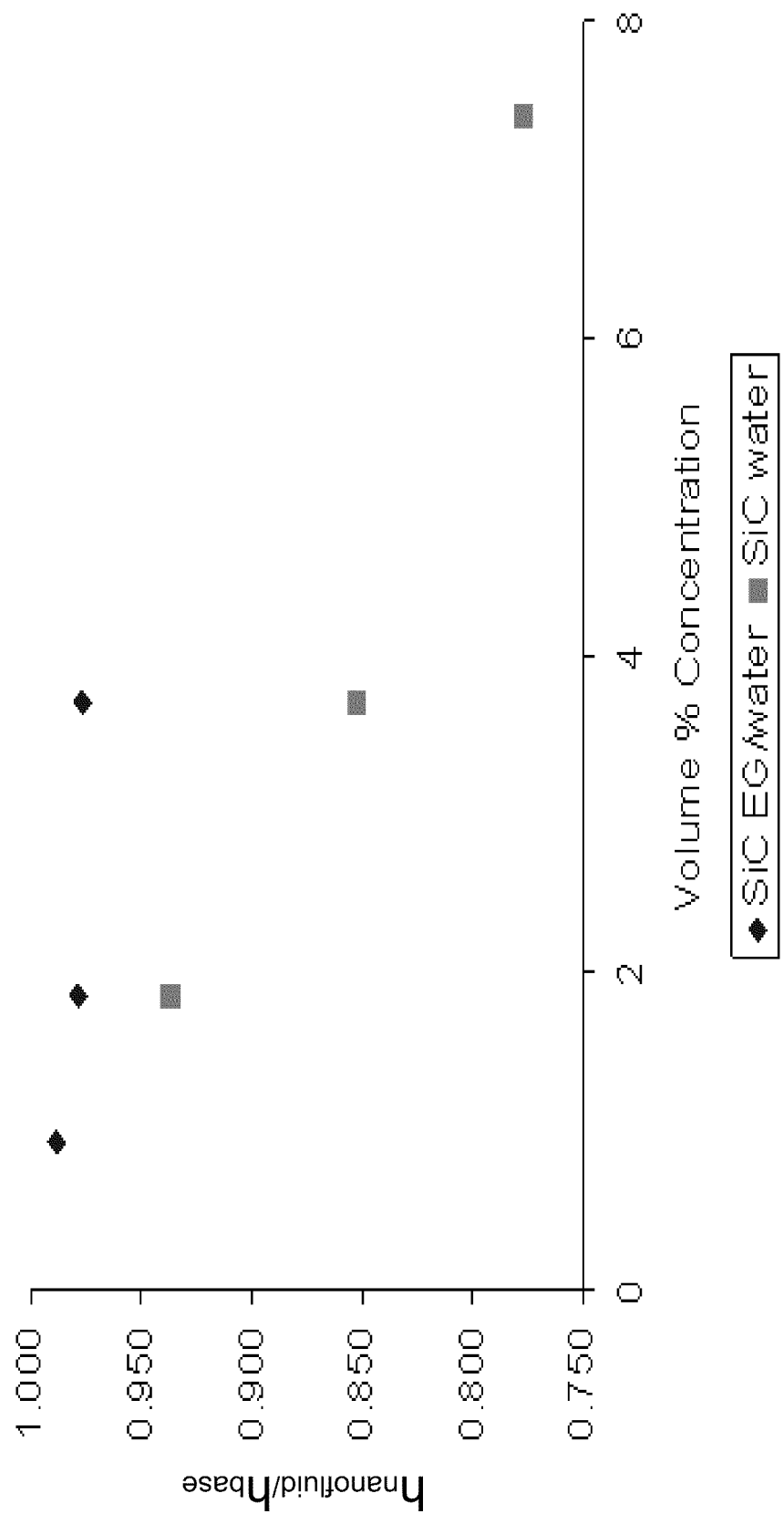
FIG. 21 shows a plot of average heat transfer coefficient for a SiC/water-ethylene glycol and SiC/water nanofluids as a function of nanoparticle volume fraction in relation to the respective base fluids at constant velocity.

FIG. 21 shows the improvement in the heat transfer coefficient of SiC/water and SiC/water-ethylene glycol nanofluids over the respective base fluids for various particle loadings. Although the relative improvement of the SiC/water nanofluid decreases with particle loading, the SiC/water-ethylene glycol nanofluid does not demonstrate the same type of decrease. Even at relatively high particle loadings, the relative heat transfer coefficient for the SiC/water-ethylene glycol nanofluids remains nearly constant.

General trends in thermal conductivity enhancement of SiC/water nanofluid can be explained by effective medium theory (EMT), using Hamilton-Crosser modification for non-spherical shape factors. Thermal conductivity enhancements, relative to the base fluid at a specific temperature, show temperature independence for the three different nanoparticle loadings depicted in FIG. 18. This observation is consistent with EMT, i.e., no temperature dependence of the thermal conductivity enhancement considered by this model. For example, the SiC/water nanofluid showed enhancement in thermal conductivity was maintained at temperatures as high as 70° C. Maintaining thermal conductivity enhancement at elevated temperatures may be desirable for applications involving elevated temperature thermal management.

Although not to be limited by theory, enhancements in thermal conductivity at higher particle loadings can be due to the contribution from the shapes of individual SiC nanoparticles or the formation of aggregates or clusters of SiC particles or a combination of both. Even though separated particles were observed with the optical microscopy conducted on highly diluted suspensions, formation of agglomerates at higher volume fractions of nanoparticles may occur.

Additionally, ceramic nanofluids can perform well in various commercial and industrial applications. Ceramic nanofluids, for instance, result in little or no erosion of the heat exchanger device during extended periods of use. For example, zero erosion has been observed for a typical radiator material, Al3003, being impacted by a stream of a 2 vol. % SiC/water nanofluid at angles of impact of 30° and 90° and at velocities between 4 and 8 m/s for hundreds of hours.

Figure 22:
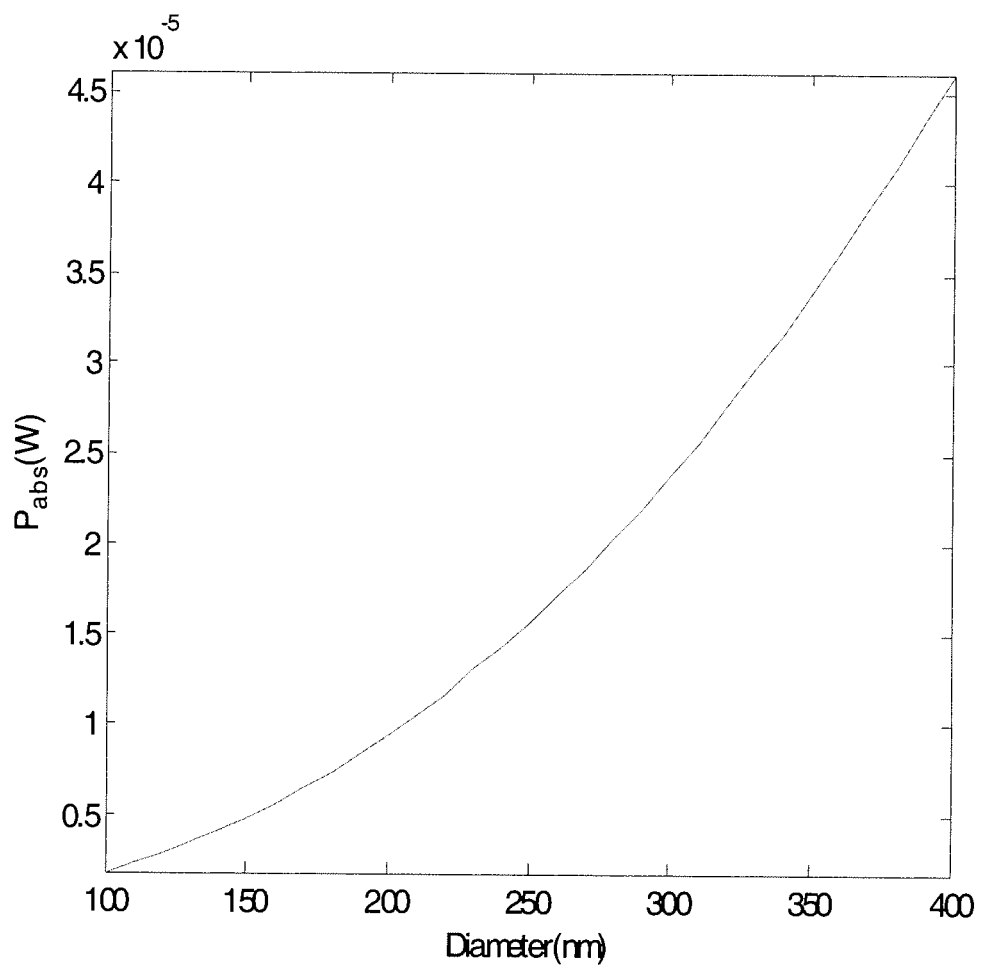
FIG. 22 shows a plot of a simulation for a single SicC particle using Mie theory for absorbed power for each SiC particle in a base fluid as a function of particle size over a solar spectrum range of 200-2000 nm.

For example, Silicon carbide nanoparticles, being a wide band semiconductor material, can provide enhanced solar to thermal energy conversion when used in a heat exchanger. The SiC nanoparticles have enhanced solar to thermal conversion characteristics that may facilitate solar energy conversion when exposed to sunlight in the heat transfer fluid pipe of a heat exchange system. Use of SiC nanoparticles in a nanofluid can lead to a rapid temperature rise and possibly a higher heat transfer fluid temperature at the heat exchanger inlet, at a fixed fluid flow rate. With reference to FIG. 22, simulations based on single particle Mie theory, show that absorbed power for each SiC particle in the base fluid as a function of particle size over the solar spectrum range of 200-2000 nm. This absorption is above the base fluid. By way of example, in a nanofluid with SiC nanoparticles with a diameter of 100 nm, at 5 vol. % loading, absorption will be enhanced by more than 10% for the nanofluid with respect to the fluid with no nanoparticles, i.e. the base fluid. Further enhancement may be obtained by varying the particle size and loading. As such, addition of SiC nanoparticles could result is additional and/or enhanced conversion of solar energy to thermal energy. Or, in a given time period, the temperature rise of the fixed volume of fluid will be higher as compared to the fluid without the nanoparticles. It is anticipated that such a development could increase overall efficiency and reduce costs to produce electricity from solar source.

The foregoing description of embodiments of the present invention has been presented for purposes of illustration and description. It is not intended to be exhaustive or to limit the present invention to the precise form disclosed, and modifications and variations are possible in light of the above teachings or may be acquired from practice of the present invention. The embodiments were chosen and described in order to explain the principles of the present invention and its practical application to enable one skilled in the art to utilize the present invention in various embodiments, and with various modifications, as are suited to the particular use contemplated.

What is claimed is:

1. A nanofluid for use in a heat transfer application, comprising:
a base heat transfer fluid and a plurality of ceramic nanoparticles dispersed throughout the base heat transfer fluid at a particle concentration, a particle size and a substantially platelet particle shape such that a stable nanofluid is formed, the ceramic nanoparticles comprising a composition having a thermal conductivity such that the nanofluid has a nanofluid thermal conductivity greater than the base heat transfer fluid thermal conductivity, wherein the nanofluid is characterized by a coefficient of heat transfer greater than the base fluid coefficient of heat transfer at a constant Reynolds number for the nanofluid and the base fluid.

2. The nanofluid of claim 1, wherein the base fluid comprises water.

3. The nanofluid of claim 2, wherein the base fluid further comprises ethylene glycol.

4. The nanofluid of claim 1, wherein the plurality of ceramic nanoparticles comprises at least one of a carbide and a nitride.

5. The nanofluid of claim 4, wherein the carbide comprises an alpha silicon carbide.

6. The nanofluid of claim 5, wherein the particle concentration of the alpha silicon carbide is from about 1% volume to about 10% volume.

7. The nanofluid of claim 1, wherein the nanofluid thermal conductivity is at least about 20 percent greater than the base fluid thermal conductivity.

8. The nanofluid of claim 1, wherein the coefficient of heat transfer is at least about 50% greater than then base fluid coefficient of heat transfer.

9. The nanofluid of claim 1, wherein the plurality of ceramic nanoparticles is characterized by the nanoparticles having a substantially platelet shape, and wherein the nanoparticles are further defined by a mean length of between about 50 to about 500 nm.

10. The nanofluid of claim 1, further comprising an additive configured to alter the pH of the nanofluid to enhance dispersion of the plurality of nanoparticles within the base fluid.

11. A nanofluid apparatus for use in a heat exchanger to improve heat transfer, comprising:
a heat exchanger being disposed within a container;
a stable nanofluid disposed within the container, the nanofluid comprising a base fluid and a plurality of alpha SiC nanoparticles comprising a substantially platelet shape, the plurality of nanoparticles dispersed, because of the nanoparticles' size and platelet shape, within the base fluid such that the nanoparticles are substantially resistant to settling.

12. The nanofluid apparatus of claim 11, wherein the base fluid comprises an aqueous solution.

13. The nanofluid apparatus of claim 11, wherein the viscosity of the stable nanofluid at 25° C. is between about 1.2 and 2.8 cP.

14. The nanofluid apparatus of claim 11, wherein the heat transfer coefficient of the stable nanofluid is at least about 20 percent greater than the base fluid under substantially identical conditions.

15. A method for using a nanofluid to enhance heat exchange with an exchange fluid, comprising:
providing a nanofluid comprising a base fluid and a plurality of ceramic nanoparticles having a substantially platelet shape and dispersed in the base fluid, the ceramic nanoparticles selected such that a coefficient of heat transfer of the nanofluid is greater than a coefficient of heat transfer of the base fluid;
providing a heat exchanger configured to circulate the nanofluid therein under turbulent conditions;
providing an exchange fluid in thermal communication with the heat exchanger; and altering the temperature of the exchange fluid by a transfer of heat between the nanofluid and the exchange fluid.

16. The method of claim 15, wherein the plurality of ceramic nanoparticles comprise alpha phase silicon carbide.

17. The method of claim 16, wherein the nanofluid is configured such that the merit parameter is at least about 0.7.

18. The method of claim 16, wherein the plurality of ceramic nanoparticles is characterized by an average thermal conductivity of at least about 100 W/m-K.

* * * * *